United States Patent
Cervelli et al.

(10) Patent No.: US 11,830,116 B2
(45) Date of Patent: Nov. 28, 2023

(54) INTERACTIVE DATA OBJECT MAP

(71) Applicant: Palantir Technologies Inc., Denver, CO (US)

(72) Inventors: Dan Cervelli, Mountain View, CA (US); Cai GoGwilt, Palo Alto, CA (US); Bobby Prochnow, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/711,881

(22) Filed: Apr. 1, 2022

(65) Prior Publication Data

US 2022/0222879 A1    Jul. 14, 2022

Related U.S. Application Data

(63) Continuation of application No. 17/027,498, filed on Sep. 21, 2020, now Pat. No. 11,295,498, which is a
(Continued)

(51) Int. Cl.
*G06T 11/60*     (2006.01)
*G06F 3/0481*    (2022.01)
(Continued)

(52) U.S. Cl.
CPC ............ *G06T 11/60* (2013.01); *G06F 3/0481* (2013.01); *G06F 3/04842* (2013.01);
(Continued)

(58) Field of Classification Search
CPC .................................................... G06F 3/0481
(Continued)

(56) References Cited

U.S. PATENT DOCUMENTS 5,329,108 A * 7/1994 Lamoure .......... G06K 19/06037
                                                  235/494
6,247,019 B1 * 6/2001 Davies ............... G01C 21/3867
                                                  434/152
(Continued)

OTHER PUBLICATIONS

H. Chen and S. T. Dumais. "Bringing order to the web: Automatically categorizing search results". In Proc. of CHI'00, pp. 145-152, Aug. 2000. (Year: 2000).*
(Continued)

*Primary Examiner* — Reza Nabi
(74) *Attorney, Agent, or Firm* — Knobbe, Martens, Olson & Bear, LLP

(57) ABSTRACT

An interactive data object map system is disclosed in which large amounts of geographical, geospatial, and other types of data, geodata, objects, features, and/or metadata are efficiently presented to a user on a map interface. The interactive data object map system allows for rapid and deep analysis of various objects, features, and/or metadata by the user. A layer ontology may be displayed to the user. In various embodiments, when the user rolls a selection cursor over an object/feature an outline of the object/feature is displayed. Selection of an object/feature may cause display of metadata associated with that object/feature. The interactive data object map system may automatically generate feature/object lists and/or histograms based on selections made by the user. The user may perform geosearches, generate heatmaps, and/or perform keyword searches, among other actions.

19 Claims, 35 Drawing Sheets

Related U.S. Application Data continuation of application No. 16/516,041, filed on Jul. 18, 2019, now Pat. No. 10,783,686, which is a continuation of application No. 14/323,878, filed on Jul. 3, 2014, now Pat. No. 10,360,705, which is a continuation of application No. 13/917,571, filed on Jun. 13, 2013, now Pat. No. 8,799,799.

(60) Provisional application No. 61/820,608, filed on May 7, 2013.

(51) Int. Cl.
*G06F 16/29* (2019.01)
*G09B 29/10* (2006.01)
*G06T 11/00* (2006.01)
*G06F 3/04842* (2022.01)

(52) U.S. Cl.
CPC ............ *G06F 16/29* (2019.01); *G06T 11/001* (2013.01); *G09B 29/106* (2013.01)

(58) Field of Classification Search
USPC ........................................................ 715/765
See application file for complete search history.

(56) References Cited

U.S. PATENT DOCUMENTS

| | | | | |
|---|---|---|---|---|
| 6,631,496 B1* | 10/2003 | Li | G06F 16/9562 | 707/999.102 |
| 6,985,950 B1* | 1/2006 | Hanson | G06F 16/287 | 709/228 |
| 7,036,085 B2* | 4/2006 | Barros | G06F 16/29 | 715/764 |
| 7,158,878 B2* | 1/2007 | Rasmussen | G06F 16/9537 | 340/995.14 |
| 7,379,811 B2* | 5/2008 | Rasmussen | G06F 16/9537 | 340/995.14 |
| 7,502,786 B2* | 3/2009 | Liu | G06F 16/9038 | 707/999.005 |
| 7,558,677 B2* | 7/2009 | Jones | G06T 19/20 | 702/14 |
| 7,574,428 B2* | 8/2009 | Leiserowitz | G01C 21/3682 | 701/532 |
| 7,620,628 B2* | 11/2009 | Kapur | G06F 16/9535 | |
| 7,809,703 B2* | 10/2010 | Balabhadrapatruni | G06F 16/93 | 707/705 |
| 7,894,984 B2* | 2/2011 | Rasmussen | G09B 29/004 | 340/995.14 |
| 7,920,963 B2* | 4/2011 | Jouline | G01C 21/36 | 701/420 |
| 7,962,281 B2* | 6/2011 | Rasmussen | G06F 3/40 | 340/995.14 |
| 8,010,545 B2* | 8/2011 | Stefik | G06F 16/355 | 707/758 |
| 8,145,703 B2* | 3/2012 | Frishert | G06F 16/9537 | 707/709 |
| 8,214,361 B1* | 7/2012 | Sandler | G06F 16/35 | 707/732 |
| 8,214,764 B2* | 7/2012 | Gemmell | G06F 16/9038 | 715/833 |
| 8,229,947 B2* | 7/2012 | Fujinaga | G06F 16/338 | 707/765 |
| 8,280,880 B1* | 10/2012 | Aymeloglu | G06F 16/248 | 707/726 |
| 8,290,942 B2* | 10/2012 | Jones | G06Q 30/0205 | 707/723 |
| 8,368,695 B2* | 2/2013 | Howell | G06T 17/05 | 345/672 |
| 8,397,171 B2* | 3/2013 | Klassen | G01C 21/3682 | 345/157 |
| 8,412,707 B1* | 4/2013 | Mianji | G06F 16/38 | 715/810 |
| 8,452,790 B1* | 5/2013 | Mianji | G06F 16/38 | 707/769 |
| 8,463,036 B1* | 6/2013 | Ramesh | G06F 16/5854 | 382/203 |
| 8,489,331 B2* | 7/2013 | Kopf | G01C 21/3614 | 701/426 |
| 8,489,641 B1* | 7/2013 | Seefeld | G06F 16/9537 | 715/788 |
| 8,498,984 B1* | 7/2013 | Hwang | G06F 16/951 | 707/723 |
| 8,515,207 B2* | 8/2013 | Chau | G06F 16/58 | 700/62 |
| 8,799,799 B1* | 8/2014 | Cervelli | G09B 29/106 | 707/723 |
| 9,953,445 B2 | 4/2018 | Cervelli et al. | | |
| 10,360,705 B2 | 7/2019 | Cervelli et al. | | |
| 10,783,686 B2 | 9/2020 | Cervelli et al. | | |
| 11,295,498 B2 | 4/2022 | Cervelli et al. | | |
| 2002/0116120 A1* | 8/2002 | Ruiz | G09B 29/006 | 340/995.11 |
| 2003/0225755 A1* | 12/2003 | Iwayama | G06F 16/355 | |
| 2005/0080769 A1* | 4/2005 | Gemmell | G06F 16/9038 | 707/999.102 |
| 2005/0182793 A1* | 8/2005 | Keenan | G09B 29/004 | |
| 2006/0026170 A1* | 2/2006 | Kreitler | G06F 16/29 | |
| 2006/0139375 A1* | 6/2006 | Rasmussen | G06F 3/0481 | 707/E17.11 |
| 2006/0271277 A1* | 11/2006 | Hu | G01C 21/3605 | 340/995.19 |
| 2007/0011150 A1* | 1/2007 | Frank | G06F 16/9537 | |
| 2007/0016363 A1* | 1/2007 | Huang | G08G 1/202 | 701/533 |
| 2007/0078832 A1* | 4/2007 | Ott | G06F 16/9535 | |
| 2007/0294643 A1* | 12/2007 | Kyle | G08G 1/096811 | 715/855 |
| 2008/0040684 A1* | 2/2008 | Crump | G06F 3/0482 | 705/14.4 |
| 2008/0077642 A1* | 3/2008 | Carbone | G06F 16/29 | 707/999.005 |
| 2008/0104019 A1* | 5/2008 | Nath | G06F 16/9537 | |
| 2008/0278311 A1* | 11/2008 | Grange | G06F 16/29 | 340/539.2 |
| 2008/0301643 A1* | 12/2008 | Appleton | H04L 67/52 | 717/124 |
| 2009/0027418 A1* | 1/2009 | Maru | G06F 16/29 | 345/629 |
| 2009/0132953 A1* | 5/2009 | Reed, Jr. | G06F 3/0481 | 715/781 |
| 2009/0144262 A1* | 6/2009 | White | G06F 16/951 | 707/999.005 |
| 2009/0171939 A1* | 7/2009 | Athsani | G06F 16/29 | 707/999.005 |
| 2009/0222400 A1* | 9/2009 | Kupershmidt | G06F 16/2246 | 706/53 |
| 2009/0292626 A1* | 11/2009 | Oxford | G06Q 50/10 | 705/26.1 |
| 2010/0057716 A1* | 3/2010 | Stefik | G06F 16/355 | 707/E17.108 |
| 2010/0070523 A1* | 3/2010 | Delgo | G06F 16/743 | 707/769 |
| 2010/0198684 A1* | 8/2010 | Eraker | G06Q 30/02 | 707/769 |
| 2010/0199225 A1* | 8/2010 | Coleman | G06F 3/038 | 715/858 |
| 2010/0293174 A1* | 11/2010 | Bennett | G06F 16/353 | 707/769 |
| 2010/0321399 A1* | 12/2010 | Ellren | G06F 16/29 | 345/522 |
| 2011/0170799 A1* | 7/2011 | Carrino | G06T 17/05 | 382/285 |
| 2011/0208724 A1* | 8/2011 | Jones | G06F 16/248 | 707/723 |
| 2012/0066296 A1* | 3/2012 | Appleton | H04L 67/56 | 709/203 |

(56) References Cited

U.S. PATENT DOCUMENTS

| | | | | |
|---|---|---|---|---|
| 2012/0208636 A1* | 8/2012 | Feige | ............... | A63F 13/335 |
| | | | | 463/31 |
| 2012/0323888 A1* | 12/2012 | Osann, Jr. | ............. | G06F 16/248 |
| | | | | 707/E17.014 |
| 2013/0176321 A1* | 7/2013 | Mitchell | ............ | G01C 21/3682 |
| | | | | 345/522 |
| 2013/0179420 A1* | 7/2013 | Park | ................... | G06F 16/9535 |
| | | | | 707/706 |
| 2013/0268520 A1* | 10/2013 | Fisher | ................ | G06F 16/2455 |
| | | | | 707/723 |
| 2013/0315437 A1* | 11/2013 | Kerschner | ............ | G06Q 30/018 |
| | | | | 705/317 |
| 2014/0337772 A1* | 11/2014 | Cervelli | .................. | G06F 16/29 |
| | | | | 715/766 |
| 2015/0046870 A1* | 2/2015 | Goldenberg | .......... | G06F 3/0481 |
| | | | | 715/781 |
| 2015/0100897 A1* | 4/2015 | Sun | ........................ | G06Q 10/10 |
| | | | | 715/753 |
| 2015/0100907 A1* | 4/2015 | Erenrich | ............... | G06F 40/143 |
| | | | | 715/765 |
| 2016/0176358 A1* | 6/2016 | Raghu | .................. | G06V 20/588 |
| | | | | 382/104 |
| 2017/0052654 A1* | 2/2017 | Cervelli | .................. | G06F 16/29 |
| 2019/0311546 A1* | 10/2019 | Tay | ...................... | G05D 1/0088 |
| 2019/0371026 A1* | 12/2019 | Cervelli | ............... | G06T 11/001 |

OTHER PUBLICATIONS

"Working screenshot of outlining boundary upon mouse over of a state in an interactive map" by SpaceBeers, Response posted at Stackoverflow.com on Dec. 1, 2011, online available at (http://www.outsharked.com/imagemapster/examples/usa.html), 6 pages. (Year: 2011).*

KKaefer, UTFGrid.md repository at Github available online at [https://github.com/mapbox/mbtiles-spec/blob/master/1.1/utfgrid.md], Published on Jun. 22, 2011 (Year: 2011).*

* cited by examiner

INTERACTIVE DATA OBJECT MAP

CROSS-REFERENCE TO RELATED APPLICATIONS

This application is a continuation of U.S. patent application Ser. No. 17/027,498, filed Sep. 21, 2020 and titled "INTERACTIVE DATA OBJECT MAP", which is a continuation of U.S. patent application Ser. No. 16/516,041, filed on Jul. 18, 2019, and titled "INTERACTIVE DATA OBJECT MAP", which is a continuation of U.S. patent application Ser. No. 14/323,878, filed on Jul. 3, 2014, and titled "INTERACTIVE DATA OBJECT MAP", which is a continuation of U.S. patent application Ser. No. 13/917,571, filed on Jun. 13, 2013, and titled "INTERACTIVE GEOSPATIAL MAP," which application claims a priority benefit under 35 U.S.C. § 119 to U.S. Provisional Patent Application No. 61/820,608, filed on May 7, 2013, and titled "INTERACTIVE DATA OBJECT MAP." All of the above-identified applications are hereby incorporated by reference herein in their entireties.

TECHNICAL FIELD

The present disclosure relates to systems and techniques for geographical data integration, analysis, and visualization. More specifically, the present disclosure relates to interactive maps including data objects.

BACKGROUND

Interactive geographical maps, such as web-based mapping service applications and Geographical Information Systems (GIS), are available from a number of providers. Such maps generally comprise satellite images or generic base layers overlaid by roads. Users of such systems may generally search for and view locations of a small number of landmarks, and determine directions from one location to another. In some interactive graphical maps, 3D terrain and/or 3D buildings may be visible in the interface.

SUMMARY

The systems, methods, and devices described herein each have several aspects, no single one of which is solely responsible for its desirable attributes. Without limiting the scope of this disclosure, several non-limiting features will now be discussed briefly.

The systems, methods, and devices of the present disclosure may provide, among other features, high-performance, interactive geospatial and/or data object map capabilities in which large amounts of geographical, geospatial, and other types of data, geodata, objects, features, and/or metadata are efficiently presented to a user on a map interface. In various embodiments, an interactive geospatial map system (also referred to as an interactive data object map system) may enable rapid and deep analysis of various objects, features, and/or metadata by the user. In some embodiments, a layer ontology may be displayed to the user. In various embodiments, when the user rolls a selection cursor over an object/feature an outline of the object/feature is displayed. Selection of an object/feature may cause display of metadata associated with that object/feature. In various embodiments, the interactive data object map system may automatically generate feature/object lists and/or histograms based on selections made by the user. Various aspects of the present disclosure may enable the user to perform geosearches, generate heatmaps, and/or perform keyword searches, among other actions.

In an embodiment, a computer system is disclosed comprising an electronic data structure configured to store a plurality of features or objects, wherein each of the features or objects is associated with metadata; a computer readable medium storing software modules including computer executable instructions; one or more hardware processors in communication with the electronic data structure and the computer readable medium, and configured to execute a user interface module of the software modules in order to: display an interactive map on an electronic display of the computer system; include on the interactive map one or more features or objects, wherein the features or objects are selectable by a user of the computer system, and wherein the features or objects are accessed from the electronic data structure; receive a first input from the user selecting one or more of the included features or objects; and in response to the first input, access, from the electronic data structure, the metadata associated with each of the selected features or objects; determine one or more metadata categories based on the accessed metadata; organize the selected features or objects into one or more histograms based on the determined metadata categories and the accessed metadata; and display the one or more histograms on the electronic display.

According to an aspect, the features or objects may comprise vector data.

According to another aspect, the features or objects may comprise at least one of roads, terrain, lakes, rivers, vegetation, utilities, street lights, railroads, hotels or motels, schools, hospitals, buildings or structures, regions, transportation objects, entities, events, or documents.

According to yet another aspect, the metadata associated with the features or objects may comprise at least one of a location, a city, a county, a state, a country, an address, a district, a grade level, a phone number, a speed, a width, or other related attributes.

According to another aspect, the features or objects may be selectable by a user using a mouse and/or a touch interface.

According to yet another aspect, each histogram of the one or more histograms may be specific to a particular metadata category.

According to another aspect, each histogram of the one or more histograms may comprise a list of items of metadata specific to the particular metadata category of the histogram, wherein the list of items is organized in descending order from an item having the largest number of related objects or features to an item having the smallest number of related objects or features.

According to yet another aspect, the one or more histograms displayed on the electronic display may be displayed so as to partially overlay the displayed interactive map.

According to another aspect, the one or more hardware processors may be further configured to execute the user interface module in order to: receive a second input from the user selecting a second one or more features or objects from the one or more histograms; and in response to the second input, update the interactive map to display the second one or more features or objects on the display; and highlight the second one or more features or objects on the interactive map.

According to yet another aspect, updating the interactive map may comprise panning and/or zooming.

According to another aspect, highlighting the second one or more features may comprise at least one of outlining, changing color, bolding, or changing contrast.

According to yet another aspect, the one or more hardware processors may be further configured to execute the user interface module in order to: receive a third input from the user selecting a drill-down group of features or objects from the one or more histograms; and in response to the third input, drill-down on the selected drill-down group of features or objects by: accessing the metadata associated with each of the features or objects of the selected drill-down group; determining one or more drill-down metadata categories based on the accessed metadata associated with each of the features or objects of the selected drill-down group; organizing the features or objects of the selected drill-down group into one or more drill-down histograms based on the determined drill-down metadata categories and the accessed metadata associated with each of the features or objects of the selected drill-down group; and displaying on the interactive map the one or more drill-down histograms.

According to another aspect, the one or more hardware processors may be further configured to execute the user interface module in order to enable the user to further drill down into the one or more drill-down histograms.

According to yet another aspect, the one or more hardware processors may be further configured to execute the user interface module in order to: receive a feature or object hover over input from the user; and in response to receiving the hover over input, highlight, on the electronic display, metadata associated with the particular hovered over feature or object to the user.

According to another aspect, one or more hardware processors may be further configured to execute the user interface module in order to: receive a feature or object selection input from the user; and in response to receiving the selection input, display, on the electronic display, metadata associated with the particular selected feature or object to the user.

In another embodiment, a computer system is disclosed comprising: an electronic data structure configured to store a plurality of features or objects, wherein each of the features or objects is associated with metadata; a computer readable medium storing software modules including computer executable instructions; one or more hardware processors in communication with the electronic data structure and the computer readable medium, and configured to execute a user interface module of the software modules in order to: display an interactive map on a display of the computer system, the interactive map comprising a plurality of map tiles accessed from the electronic data structure, the map tiles each comprising an image composed of one or more vector layers; include on the interactive map a plurality of features or objects accessed from the electronic data structure, the features or objects being selectable by a user, each of the features or objects including associated metadata; receive an input from a user including at least one of a zoom action, a pan action, a feature or object selection, a layer selection, a geosearch, a heatmap, and a keyword search; and in response to the input from the user: request, from a server, updated map tiles, the updated map tiles being updated according to the input from the user; receive the updated map tiles from the server; and update the interactive map with the updated map tiles.

According to an aspect, the one or more vector layers may comprise at least one of a regions layer, a buildings/structures layer, a terrain layer, a transportation layer, or a utilities/infrastructure layer.

According to an aspect, each of the one or more vector layers may be comprised of one or more sub-vector layers.

In yet another embodiment, a computer system is disclosed comprising: one or more hardware processors in communication with the computer readable medium, and configured to execute a user interface module of the software modules in order to: display an interactive map on a display of the computer system, the interactive map comprising a plurality of map layers; determine a list of available map layers; organizing the list of available map layers according to a hierarchical layer ontology, wherein like map layers are grouped together; and display on the interactive map the hierarchical layer ontology, wherein the user may select one or more of the displayed layers, and wherein each of the available map layers is associated with one or more feature or object types.

According to an aspect, the map layers may comprise at least one of vector layers and base layers.

BRIEF DESCRIPTION OF THE DRAWINGS

The following aspects of the disclosure will become more readily appreciated as the same become better understood by reference to the following detailed description, when taken in conjunction with the accompanying drawings.

DETAILED DESCRIPTION OF SPECIFIC EMBODIMENTS

Overview

Figure 1:
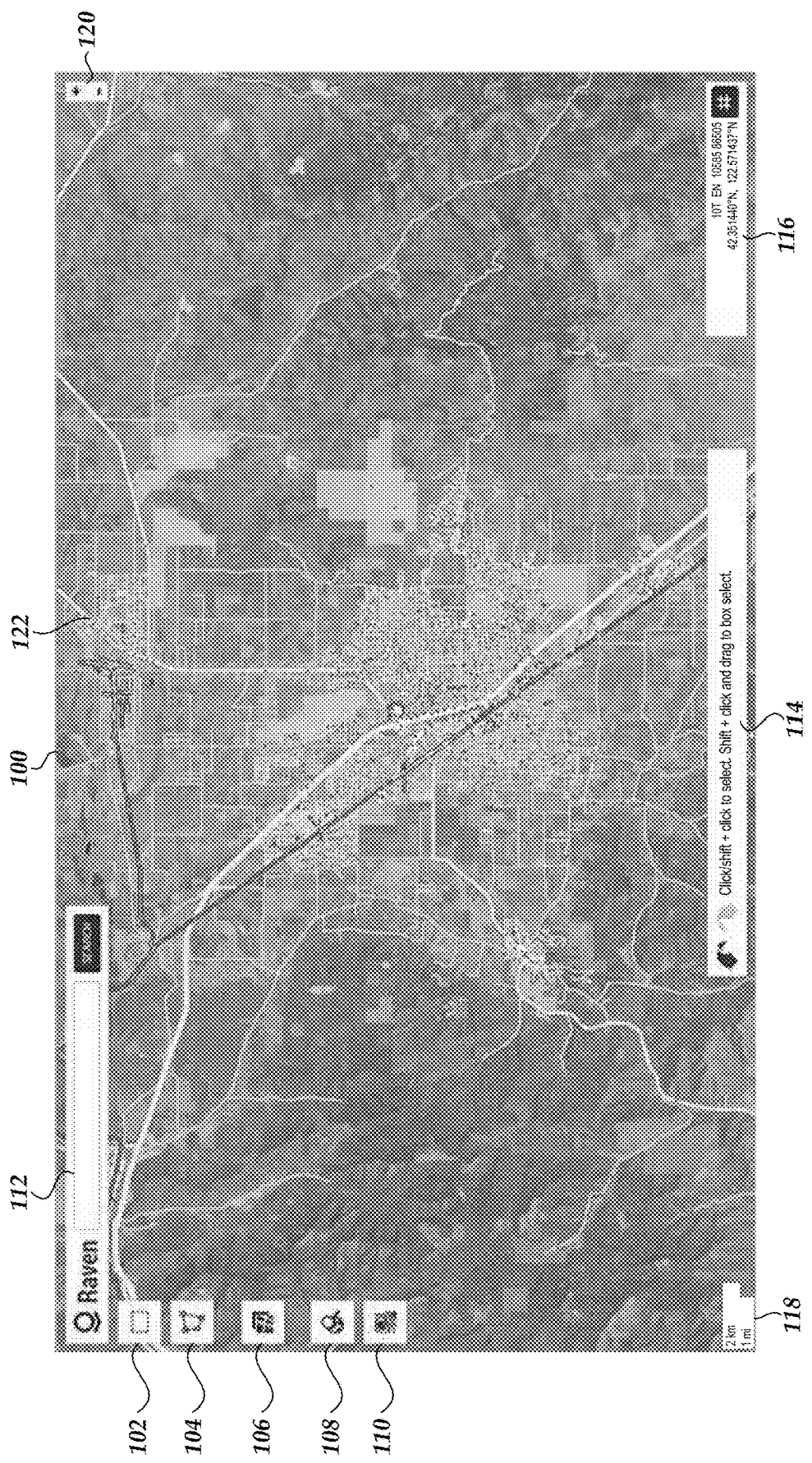
FIG. 1 illustrates a sample user interface of the interactive data object map system, according to an embodiment of the present disclosure.

In general, a high-performance, interactive data object map system (or "map system") is disclosed in which large amounts of geographical, geospatial, and other types of data, geodata, objects, features, and/or metadata are efficiently presented to a user on a map interface. The interactive data object map system allows for rapid and deep analysis of various objects, features, and/or metadata by the user. For example, millions of data objects and/or features may be simultaneously viewed and selected by the user on the map interface. A layer ontology may be displayed to the user that allows the user to select and view particular layers. In various embodiments, when the user rolls a selection cursor over an object/feature (and/or otherwise selects the object/feature) an outline of the object/feature is displayed. Selection of an object/feature may cause display of metadata associated with that object/feature.

In an embodiment, the user may rapidly zoom in and out and/or move and pan around the map interface to variously see more or less detail, and more or fewer objects. In various embodiments, the interactive data object map system may automatically generate feature/object lists and/or histograms based on selections made by the user. In various embodiments, the user may perform geosearches (based on any selections and/or drawn shapes), generate heatmaps, and/or perform keyword searches, among other actions as described below.

In an embodiment, the interactive data object map system includes server-side computer components and/or client-side computer components. The client-side components may implement, for example, displaying map tiles, showing object outlines, allowing the user to draw shapes, and/or allowing the user to select objects/features, among other actions. The server-side components may implement, for example, composition of layers into map tiles, caching of composed map tiles and/or layers, and/or providing object/feature metadata, among other actions. Such functions may be distribution in any other manner. In an embodiment, object/feature outlines and/or highlighting are accomplished on the client-side through the use of a UTF grid.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: A hierarchical arrangement and/or grouping of data according to similarities and differences. The present disclosure describes two ontologies. The first relates to the arrangement of vector layers consisting of map and object data as used by the interactive data object map system (as described below with reference to FIGS. 2A-2B). The second relates to the storage and arrangement of data objects in one or more databases (as described below with reference to FIGS. 8A-8C). For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object, Object, or Feature: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties. For the purposes of the present disclosure, the terms "feature," "data object," and "object" may be used interchangeably to refer to items displayed on the map interface of the interactive data object map system, and/or otherwise accessible to the user through the interactive data object map system. Features/objects may generally include, but are not limited to, roads, terrain (such as hills, mountains, rivers, and vegetation, among others), street lights (which may be represented by a streetlight icon), railroads, hotels/motels (which may be represented by a bed icon), schools (which may be represented by a parent-child icon), hospitals, other types of buildings or structures, regions, transportation objects, and other types of entities, events, and documents, among others. Objects displayed on the map interface generally comprise vector data, although other types of data may also be displayed. Objects generally have associated metadata and/or properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Also referred to as "metadata," includes attributes of a data object/feature. At a minimum, each property/metadata of a data object has a type (such as a property type) and a value or values. Properties/metadata associated with features/objects may include any information relevant to that feature/object. For example, metadata associated with a school object may include an address (for example, 123 S. Orange Street), a district (for example, 509c), a grade level (for example, K-6), and/or a phone number (for example, 800-0000), among other items of metadata. In another example, metadata associated with a road object may include a speed (for example, 25 mph), a width (for example, 2 lanes), and/or a county (for example, Arlington), among other items of metadata.

Property Type: The data type of a property, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

DESCRIPTION OF THE FIGURES

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1 illustrates a sample user interface of the interactive data object map system, according to an embodiment of the present disclosure. The user interface includes a map interface 100, a selection button/icon 102, a shape button/icon 104, a layers button/icon 106, a geosearch button/icon 108, a heat map button/icon 110, a search box 112, a feature information box 114, a coordinates information box 116, map scale information 118, zoom selectors 120, and highlighted features 122. The functionality of the interactive data object map system may be implemented in one or more computer modules and/or processors, as is described below with reference to FIG. 8D.

The map interface 100 of FIG. 1 is composed of multiple map tiles. The map tiles are generally composed of multiple layers of geographical, vector, and/or other types of data. Vector data layers (also referred to as vector layers) may include associated and/or linked data objects/features. In an embodiment, vector layers are composed of data objects/features. The various data objects and/or features associated with a particular vector layer may be displayed to the user when that particular vector layer is activated. For example, a transportation vector layer may include road, railroad, and bike path objects and/or features that may be displayed to the user when the transportation layer is selected. The layers used to compose the map tiles and the map interface 100 may vary based on, for example, whether a user has selected features displayed in the map interface 100, and/or the particular layers a user has selected for display. In an embodiment, composition of map tiles is accomplished by server-side components of the interactive data object map system. In an embodiment, composed map tiles may be cached by the server-side components to speed up map tile delivery to client-side components. The map tiles may then be transmitted to the client-side components of the interactive data object map system where they are composed into the map interface 100.

In general, the user interface of FIG. 1 is displayed on an electronic display viewable by a user of the interactive data object map system. The user of the interactive data object map system may interact with the user interface of FIG. 1 by, for example, touching the display when the display is touch-enabled and/or using a mouse pointer to click on the various elements of the user interface.

The map interface 100 includes various highlighted features 122 and feature icons. For example, the map interface 100 includes roads, buildings and structures, utilities, lakes, rivers, vegetation, and railroads, among other features. The user may interact with the map interface 100 by, for example, rolling over and/or clicking on various features. In one embodiment, rolling over and/or placing the mouse pointer over a feature causes the feature to be outlined and/or otherwise highlighted. Additionally, the name of the feature and/or other information about the feature may be shown in the feature information box 114.

The user of the map system may interact with the user interface of FIG. 1 by scrolling or panning up, down, and/or side to side; zooming in or out; selecting features; drawing shapes; selecting layers; performing a geosearch; generating a heat map; and/or performing a keyword search; among other actions as are described below. Various user actions may reveal more or less map detail, and/or more or fewer features/objects.

Figure 2A:
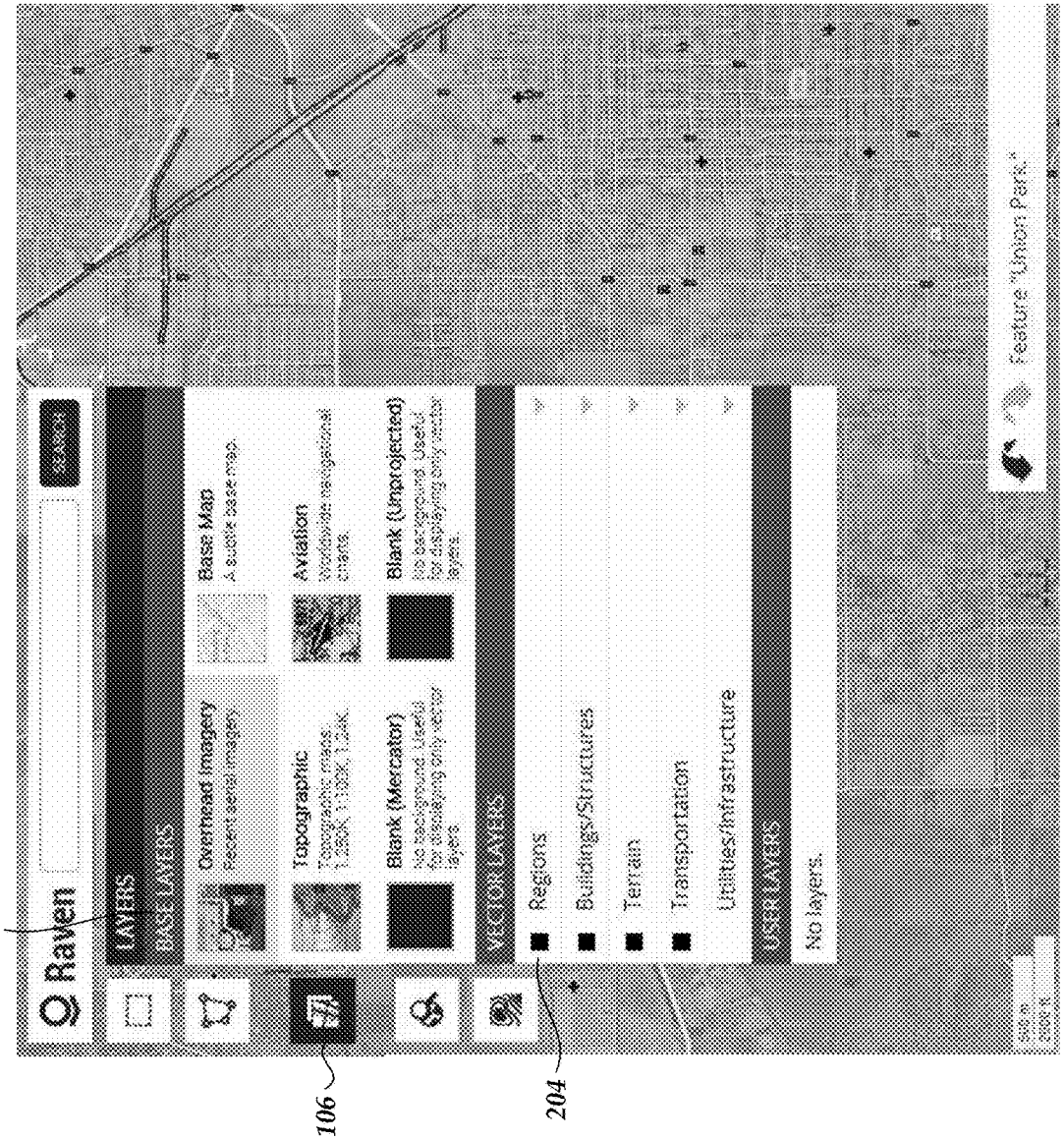
FIG. 2A illustrates a sample user interface of the interactive data object map system in which map layers are displayed to a user, according to an embodiment of the present disclosure.

FIG. 2A illustrates a sample user interface of the map system in which map layers are displayed to a user, according to an embodiment of the present disclosure. In the user interface of FIG. 2A, the user has selected the layers button 106, revealing the layers window 202. The layers window 202 includes a list of base layers, vector layers, and user layers. The base layers include, for example, overhead imagery, topographic, blank (Mercator), base map, aviation, and blank (unprojected). The vector layers include general categories such as, for example, regions, buildings/structures, terrain, transportation, and utilities/infrastructure. While no user layers are included in the user interface of FIG. 2A, user layers may be added by the user of the map system, as is described below.

In an embodiment, the user may select one or more of the base layers which may be used during composition of the map tiles. For example, selection of the overhead imagery base layer will produce map tiles in which the underlying map tile imagery is made up of recent aerial imagery. Similarly, selection of the topographic base layer will produce map tiles in which the underlying map tile imagery includes topographic map imagery.

Further, in an embodiment, the user may select one or more of the vector layers which may be used during composition of the map tiles. For example, selecting the transportation layer results in transportation-related objects and/or features being displayed on the map tiles. Transportation-related features may include, for example, roads, railroads, street signs, and/or street lights, among others. Examples of transportation-related features may be seen in the user interface of FIG. 2A where various roads, railroads, and street light icons are displayed.

In an embodiment, the user of the map system may create and save map layers. These saved map layers may be listed as user layers in the layers window 202.

Figure 2B:
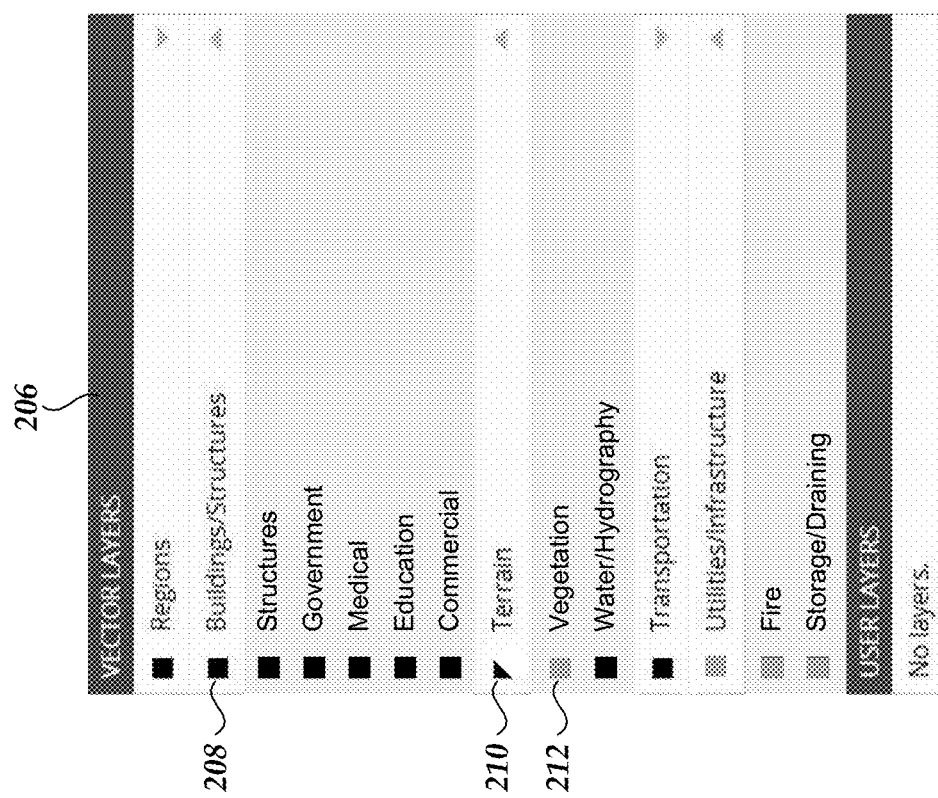
FIG. 2B illustrates an example map layer ontology, according to an embodiment of the present disclosure.

FIG. 2B illustrates an example map layer ontology, according to an embodiment of the present disclosure. As mentioned above with reference to FIG. 2A, the list of vector layers in the layers window 202 may include general categories/layers such as regions, buildings/structures, terrain, transportation, and utilities/infrastructure. The vector layers available in the map system may be further organized into an ontology, or hierarchical arrangement. For example, as shown in the vector layers window 206, the buildings/structures category 208 may be further subdivided into layers including structures, government, medical, education, and commercial. The terrain category 210 may include vegetation and/or water/hydrography layers. The utilities/infrastructure category may include fire and/or storage/draining.

In an embodiment, the user of the map system may select one or more of the layers and/or sub-layers of the layer ontology. As shown in FIG. 2B, the user has deselected the vegetation sub-layer, and all of the utilities/infrastructure layers. Selecting and deselecting vector layers, or toggling vectors layers on and off, may cause the vector objects and/or features associated with those layers to be displayed or not displayed in the map interface. For example, when the user selects the transportation category/layer, road objects associated with the transportation layer may be displayed on the map interface. Likewise, when a user deselects the transportation category/layer, road objects associated with the transportation layer may be removed from the map interface.

In an embodiment, additional hierarchical levels of layers may be displayed to the user. For example, the vector layers window 206 may include sub-sub-layers (for example, the education sub-layer may be divided into elementary schools, secondary schools, and post-secondary schools). Alternatively, fewer hierarchical levels may be displayed to the user.

In an embodiment, each of the vector layers shown in the vector layers window 206 may be made up of many layers of map vector data. In this embodiment, the map system may advantageously generate a simplified layer ontology, such as the one shown in 206. The simplified layer ontology allows the user to easily select layers of interest from a reduced number of layers, rather than a large number of discrete layers. As described above, vector layers may contain data regarding associated features and/or objects. Thus, features visible in the map interface correspond to the currently active/selected layers. In an embodiment, the layer ontology may have an arbitrary depth.

Figure 2C:
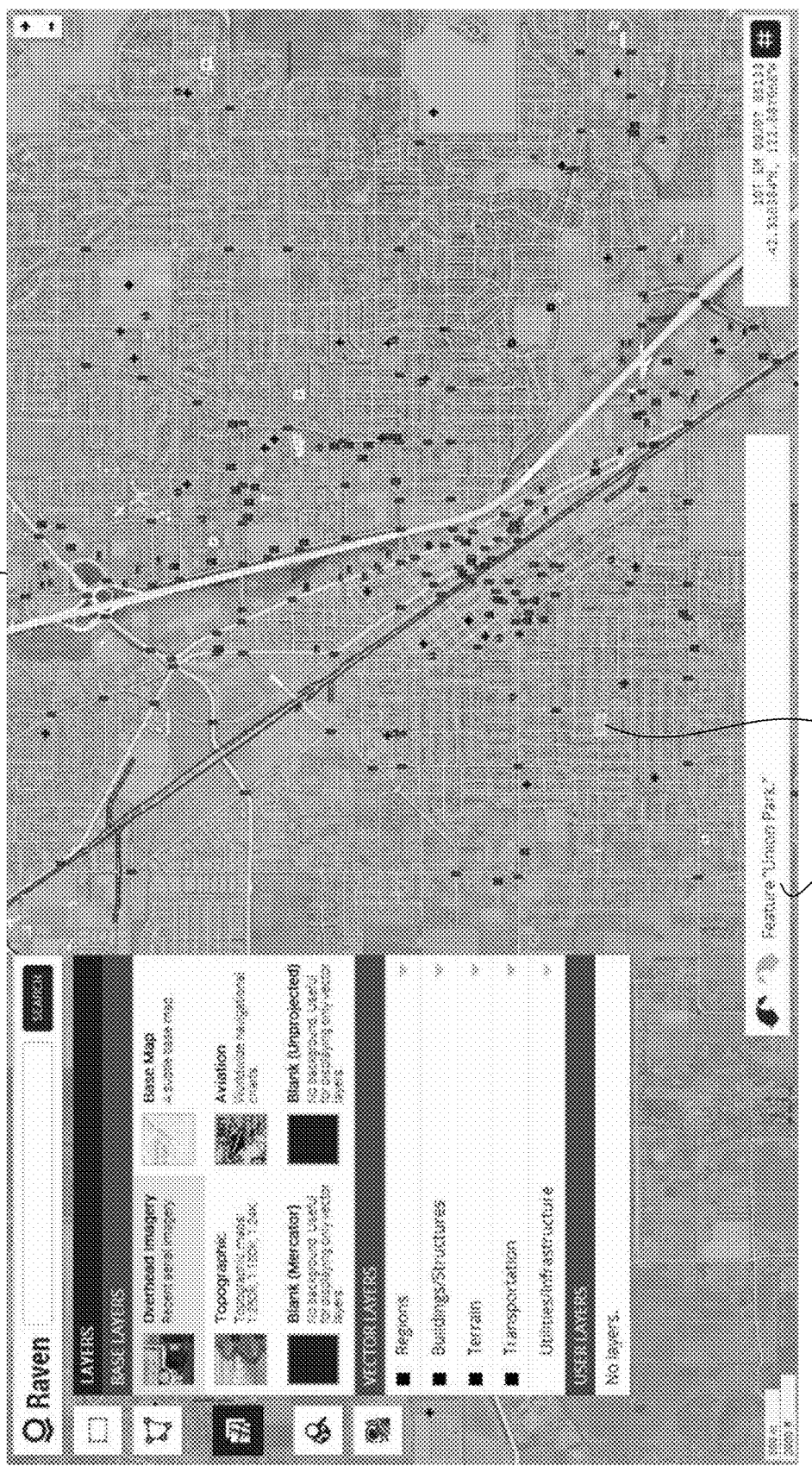
FIG. 2C illustrates a sample user interface of the interactive data object map system in which various objects are displayed, according to an embodiment of the present disclosure.

FIG. 2C illustrates a sample user interface of the map system in which various objects are displayed, according to an embodiment of the present disclosure. The user interface of FIG. 2C includes a map interface 214, an outlined feature 216, and feature information box 114 indicating that the outlined feature 216 is called "Union Park." Various features/objects may be seen in the map interface 214 including, for example, roads, buildings, terrain, street lights (represented by a streetlight icon), railroads, hotels/motels (represented by a bed icon), and schools (represented by a parent-child icon), among other features.

Figure 3A:
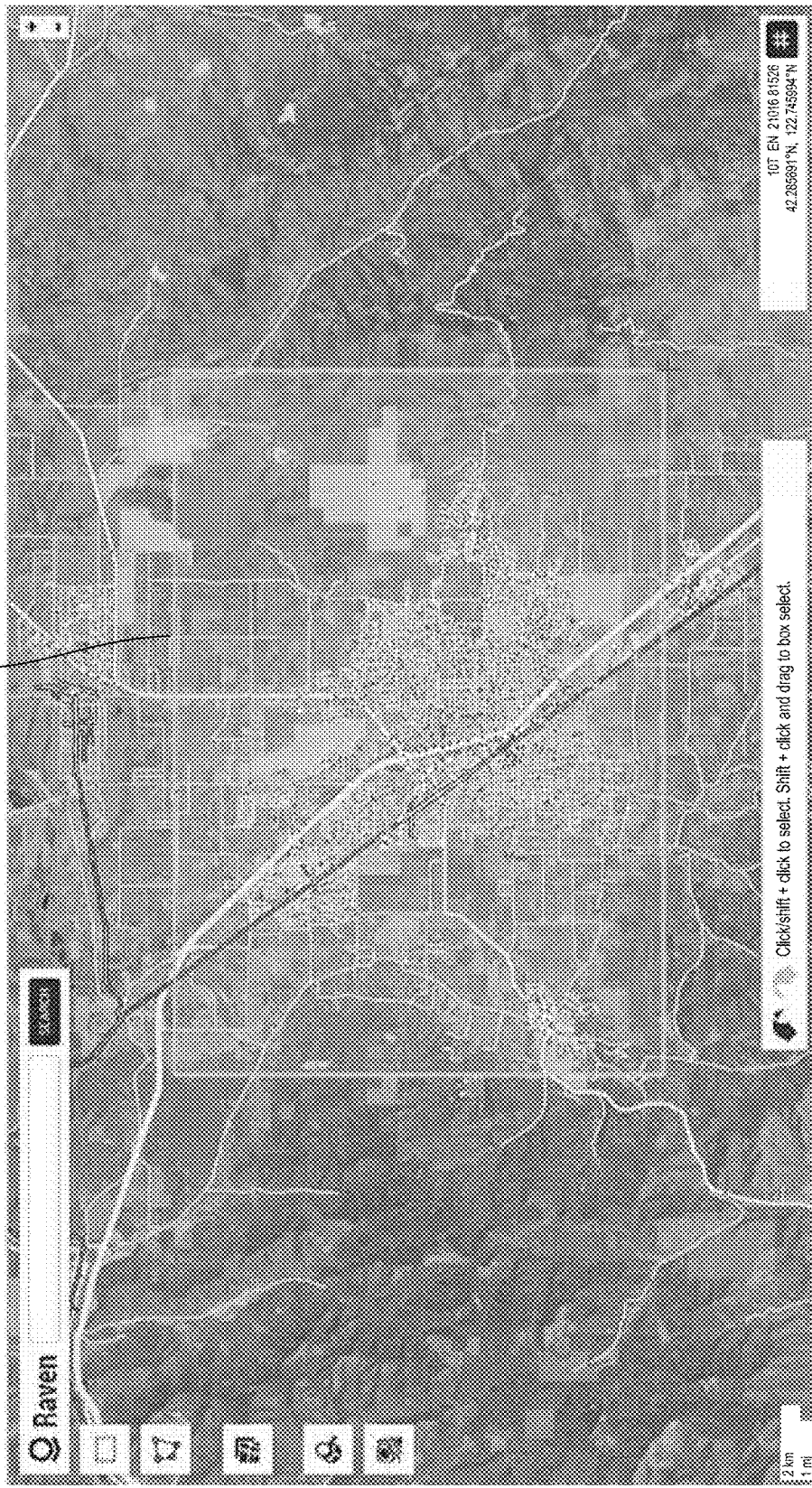
FIG. 3A illustrates a sample user interface of the interactive data object map system in which objects are selected, according to an embodiment of the present disclosure.

FIG. 3A illustrates a sample user interface of the map system in which objects are selected, according to an embodiment of the present disclosure. The user interface of FIG. 3A includes a highlighted user selection rectangle 302. The highlighted user selection rectangle 302 illustrates the user actively selecting a particular region of the map interface so as to select the features/objects that fall within the bounds of that rectangle. In an embodiment, visible features may be selected by the user, while features that are not currently visible are not selectable. For example, features related to layers that are not currently active are not selected when the user performs a selection. In another embodiment, even features that are not visible in a selected area may be selected.

Figure 3B:
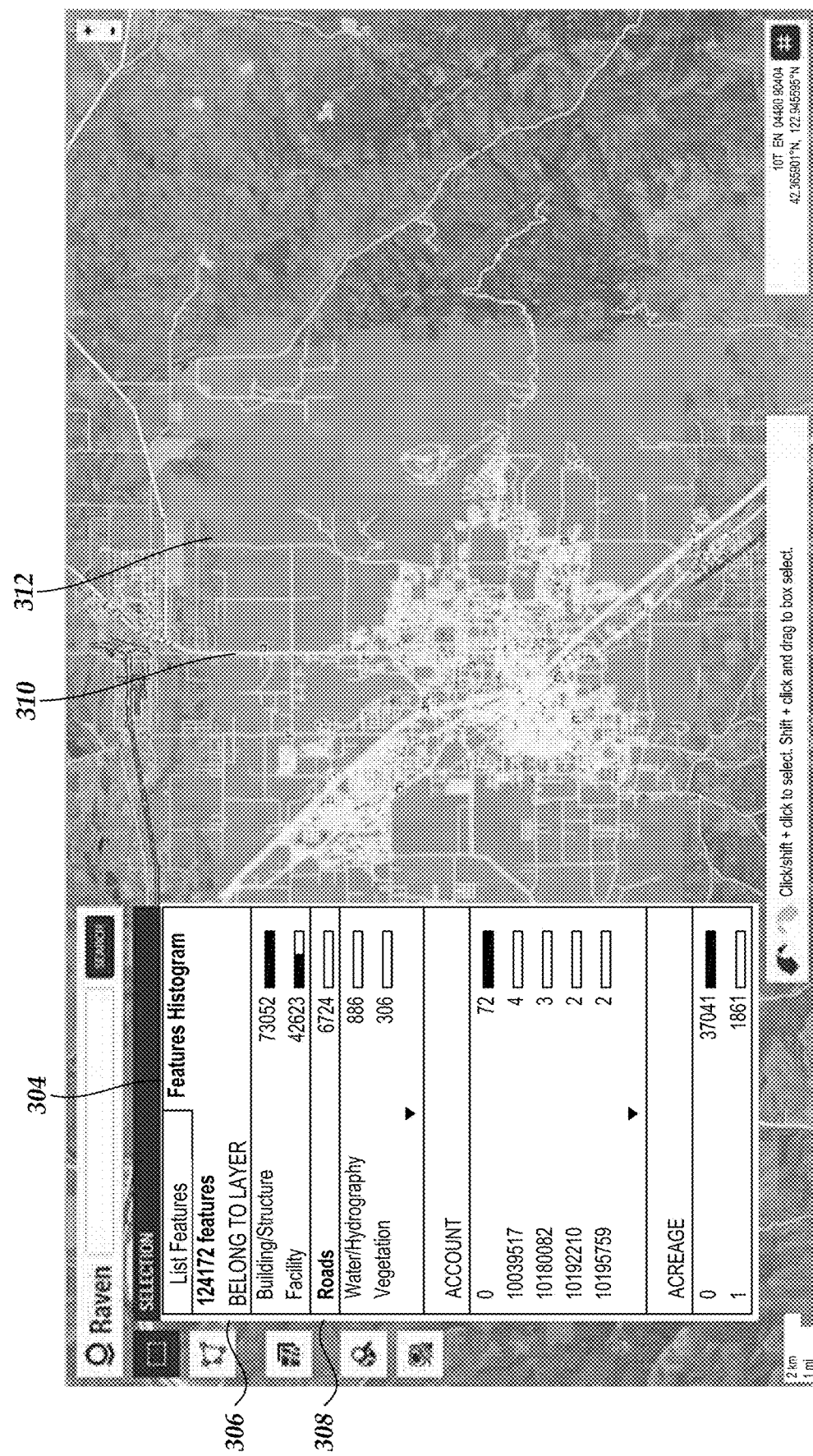
FIGS. 3B-3G illustrate sample user interfaces of the interactive data object map system in which objects are selected and a histogram is displayed, according to embodiments of the present disclosure.
Figure 3C:
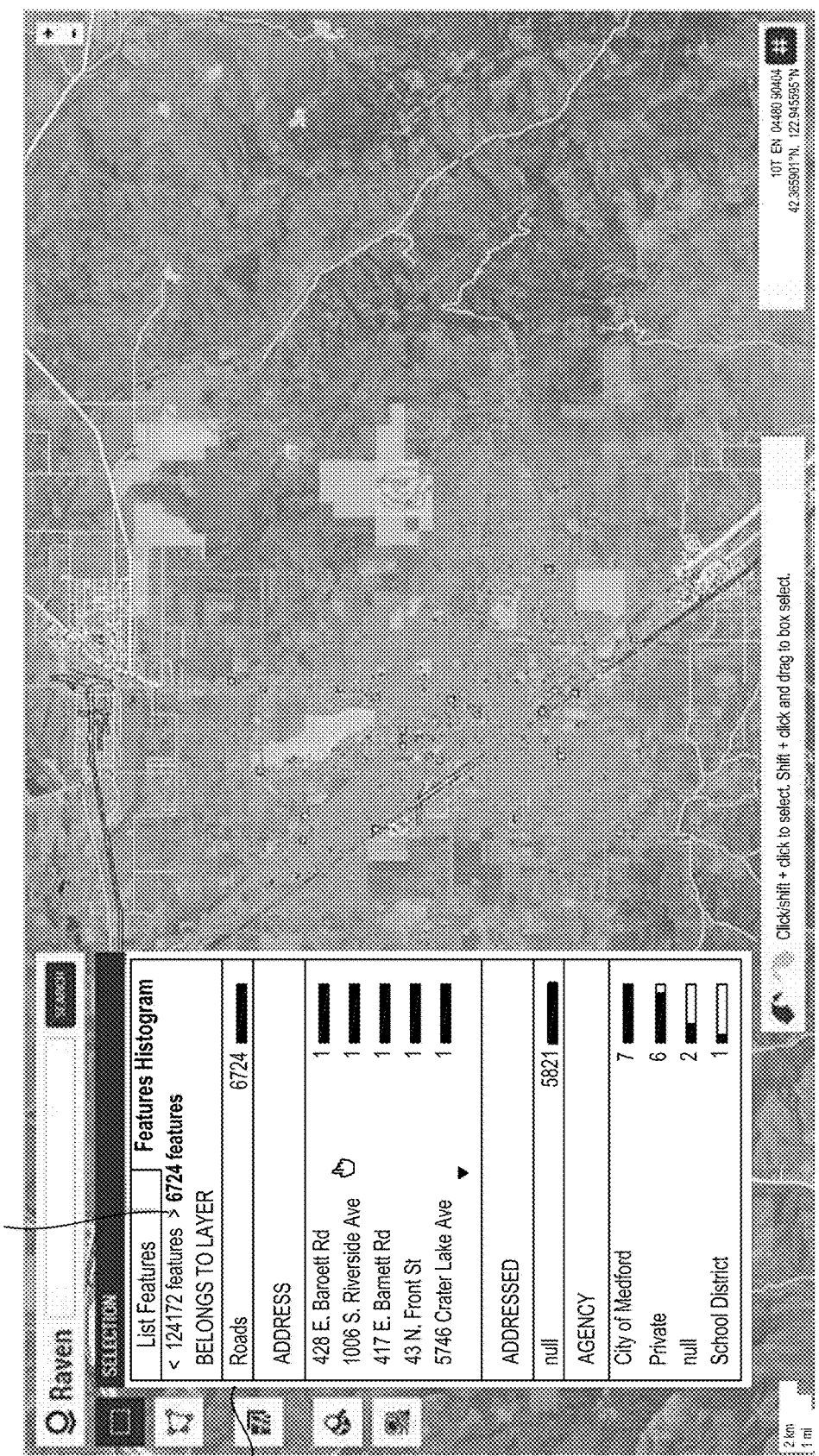

FIGS. 3B-3C illustrate sample user interfaces of the map system in which objects are selected and a feature histogram 304 is displayed in a selection window, according to embodiments of the present disclosure. The selected objects/features of FIG. 3B (including roads 310 and other features 312) may have been selected via the highlighted user selection rectangle 302 of FIG. 3A. Selected features are indicated by highlighting and/or altered colors on the map tiles making up the map interface.

Feature histogram 304 is shown in a selection window included in the user interface of FIG. 3B. The histogram 304 shows a categorized histogram of all objects/features selected by the user in the map interface. The histogram divides the features into common buckets and/or categories based on related metadata (also referred to as metadata categories). For example, at 306, "Belongs to Layer" indicates that the following histogram includes all selected features organized by layer category. In this example there are over 70,000 selected buildings/structures features, over 40,000 selected facility features, and over 6,000 selected road features, among others. Further, the feature histogram 304 includes histograms of the selected objects organized by account and acreage. In various embodiments, the map system may select histogram categories and/or metadata categories based on, for example, the features selected and/or types of features selected, among others. Any other categorization of selected features may be displayed in the histograms of the feature histogram 304.

In an embodiment, the user of the map system may select a subset of the selected features for further analysis and/or histogram generation. For example, the user may select a subset comprising selected objects belonging to the road category by, for example, clicking on the roads item 308. This selection may result in "drilling down" to histograms of that subset of features, as shown in FIG. 3C. Thus, a drill-down group of features/objects (for example, the subset of features/objects) may be used by the map system to determine new drill-down metadata categories, or buckets of related metadata. At 314 in FIG. 3C, the arrow icon indicates that of the originally selected 124,172 features, the feature histogram now shows an analysis of the 6,724 features belonging to the road category (see item 316). The feature histogram window of FIG. 3C thus shows a new set of histograms organized by layer, address, addressed, and agency, among others. The user may thus "drill down" and "drill up" through the selected features via the displayed histograms.

In an embodiment, items selected in the feature histogram are correspondingly highlighted in the map interface of the map system. For example, in the map interface of FIG. 3B, the user has selected the roads in the histogram at 308.

Corresponding features (in this example, roads) are thus highlighted in the map interface (as shown at 310).

Figure 3D:
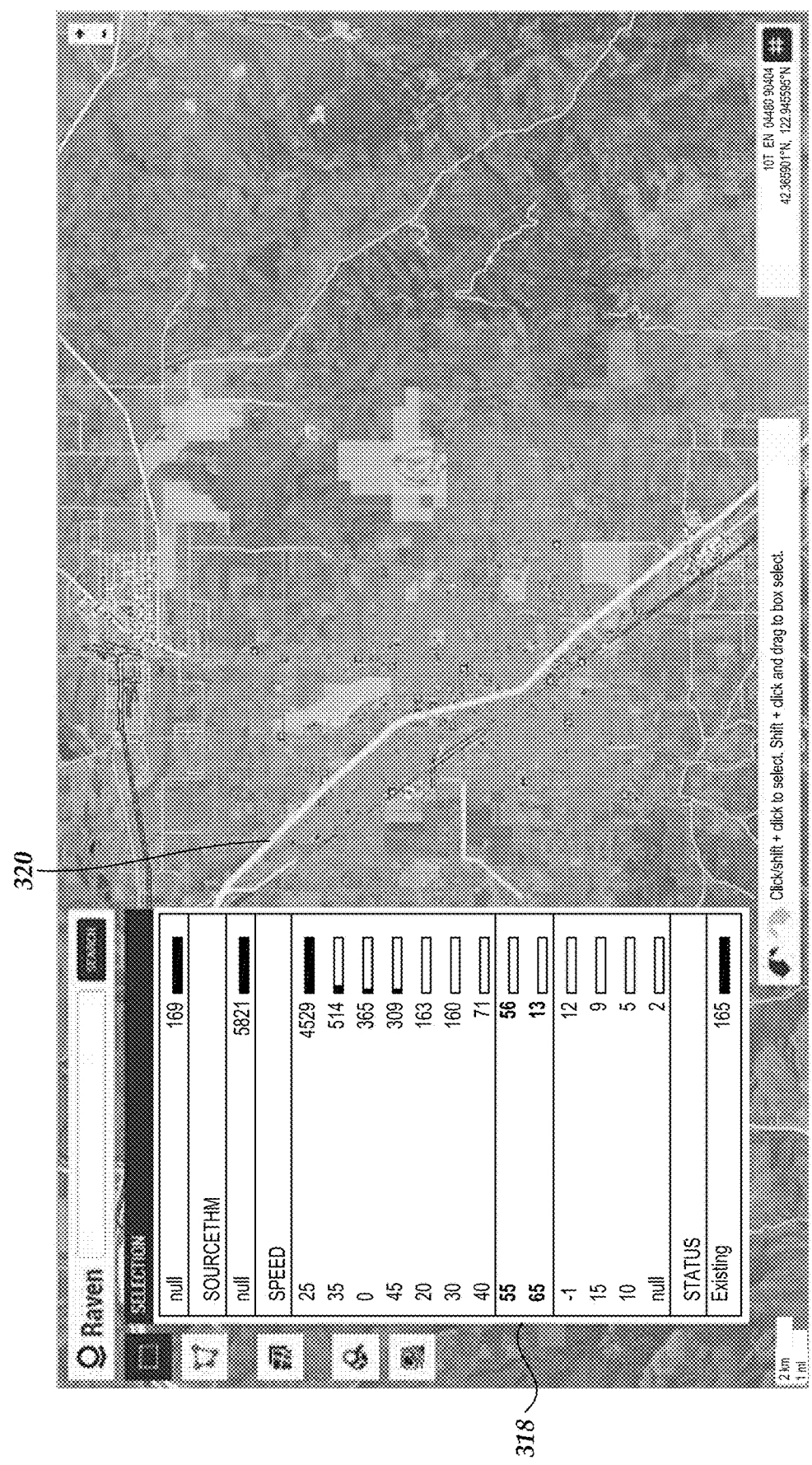
Figure 3E:
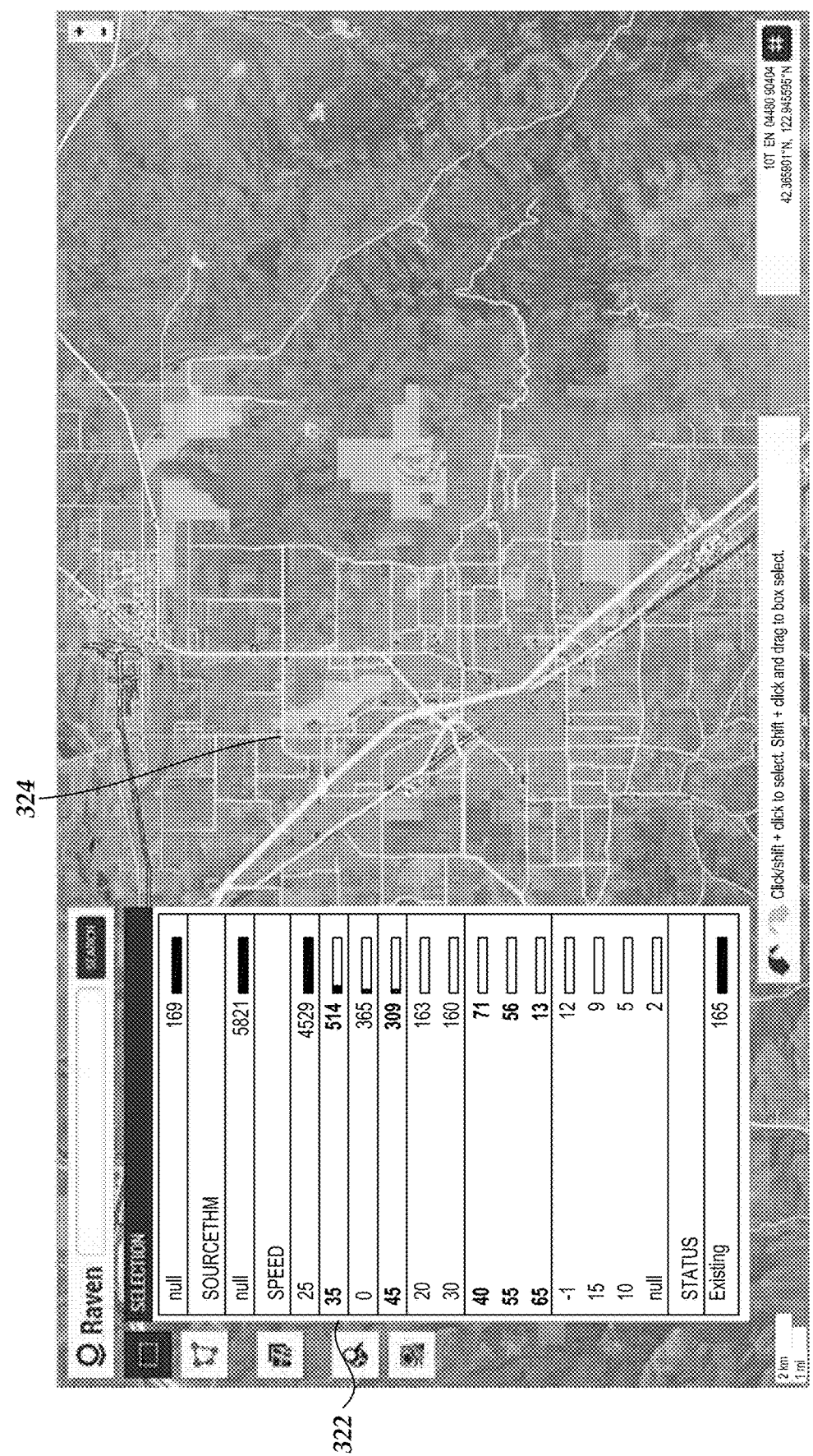
Figure 3F:
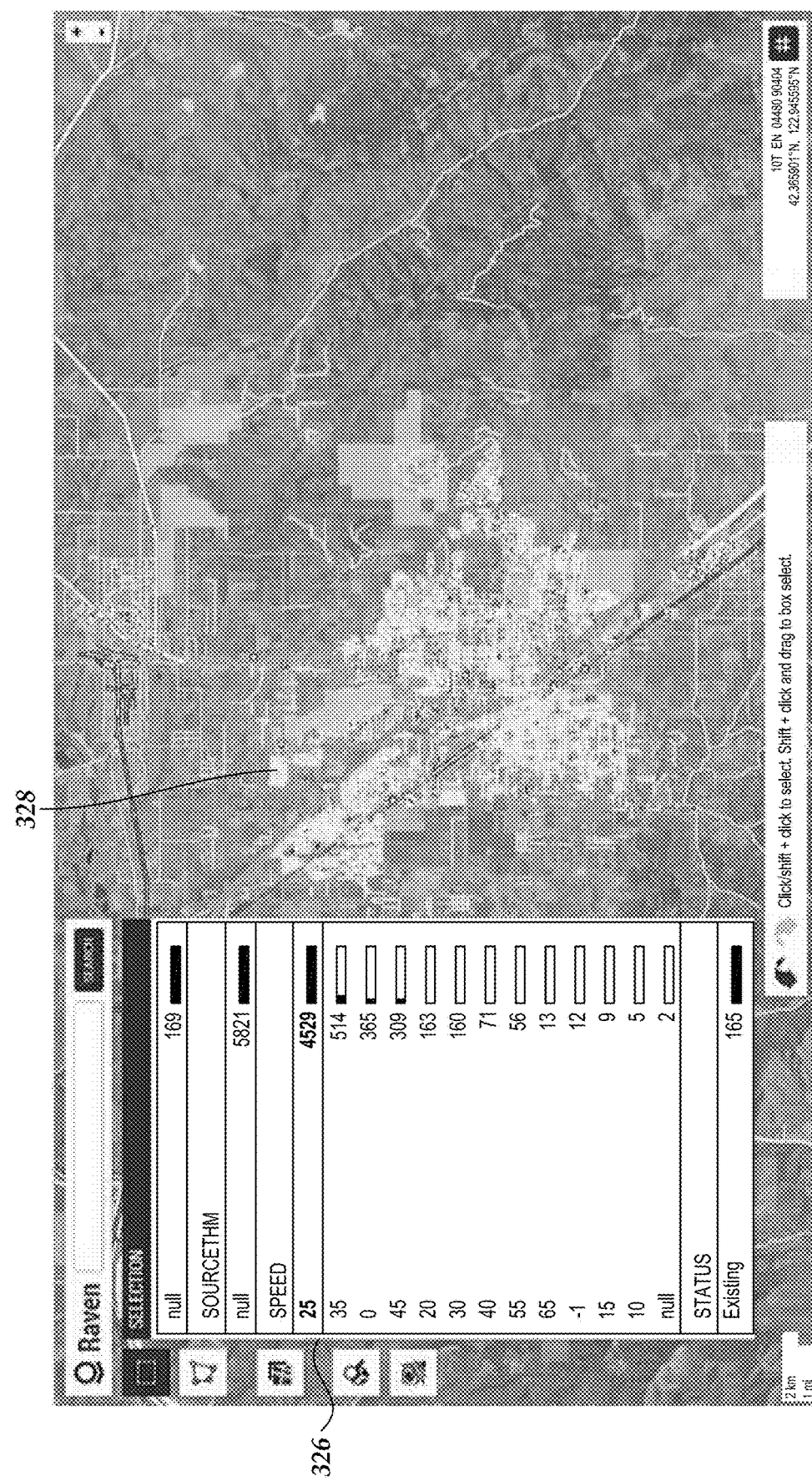
Figure 3G:
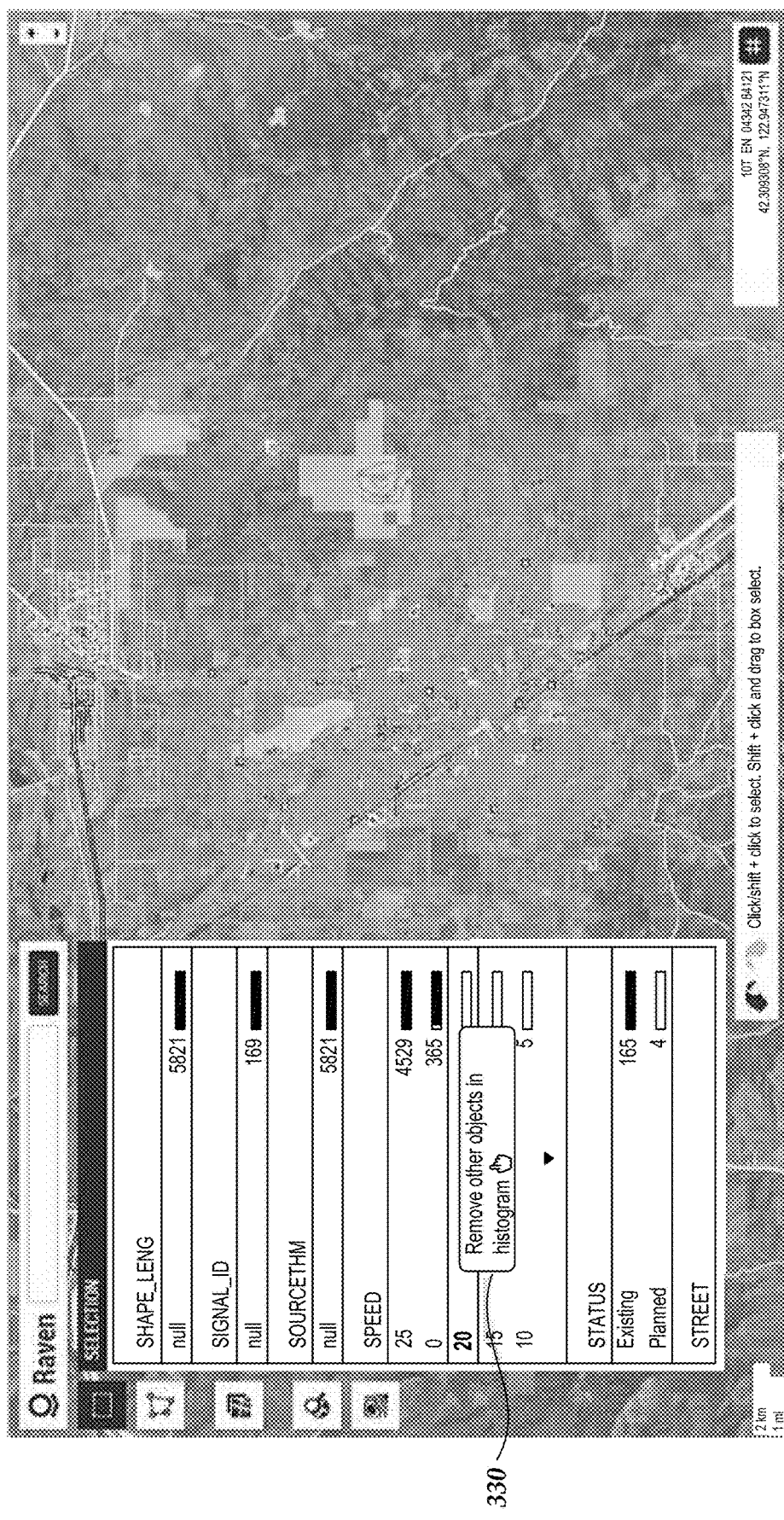

FIGS. 3D-3G illustrate additional example user interfaces of the map system in which objects are selected from a histogram and correspondingly highlighted in the map interface, according to embodiments of the present disclosure. In FIGS. 3D-3F, in the selection window, the user is viewing a histogram of all selected roads organized in a histogram according to the road speed limit. In FIG. 3D, the user has selected (at 318) roads with speed limits of 55 and 65. The corresponding road features are highlighted in the map interface at, for example 320. In FIG. 3E, the user has selected (at 322) roads with speed limits of 35, 45, 40, 55, and 65. The corresponding road features are highlighted in the map interface at, for example 324. In FIG. 3F, the user has selected (at 326) roads with speed limits of 25. The corresponding road features are highlighted in the map interface at, for example 328. In FIG. 3G, the user may "drill down" into the histogram by, for example, right clicking on an item and selecting "Remove other objects in histogram" (330).

Figure 3H:
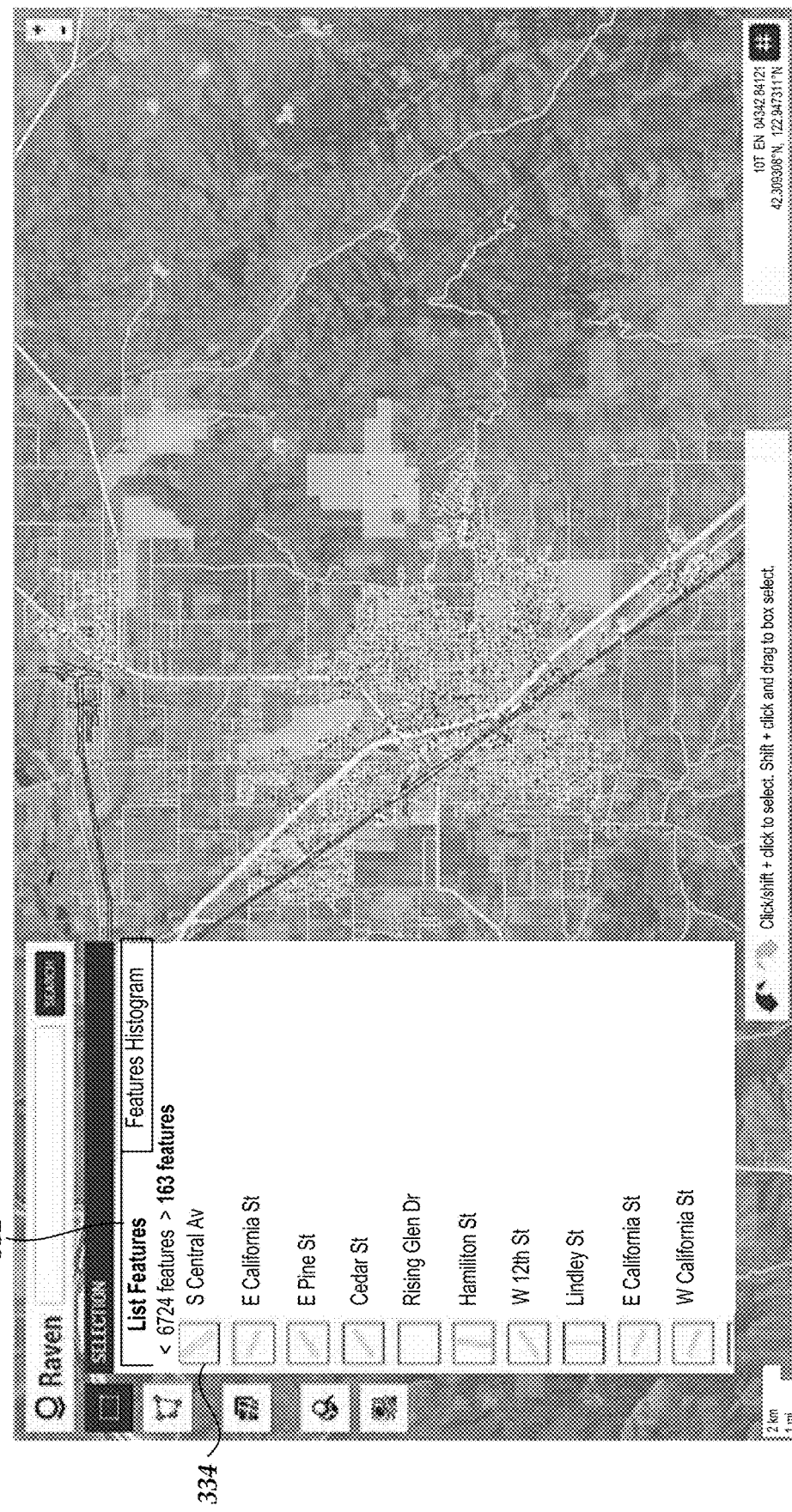
FIGS. 3H-3I illustrate sample user interfaces of the interactive data object map system in which objects are selected and a list of objects is displayed, according to embodiments of the present disclosure.
Figure 3I:
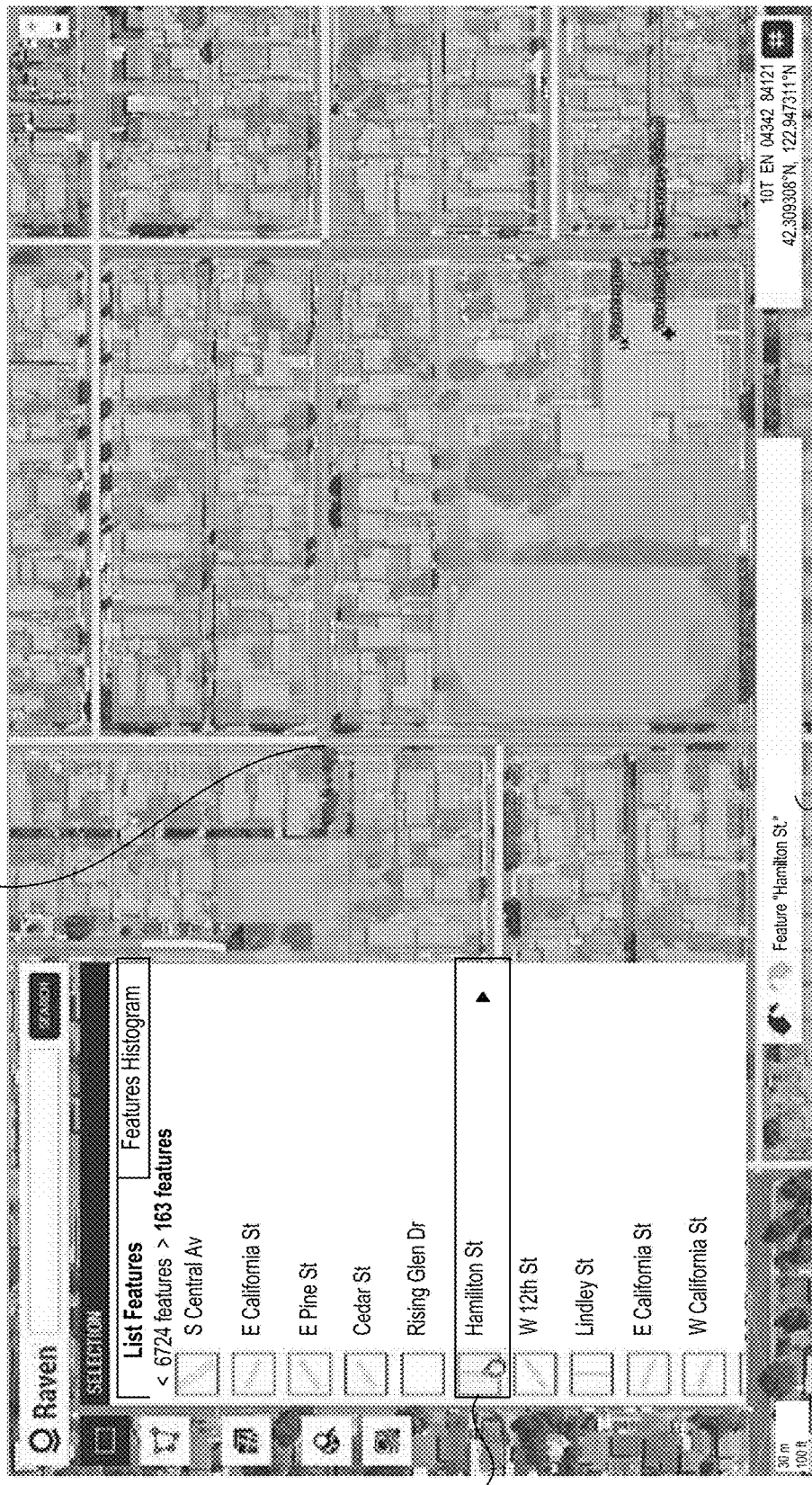

FIGS. 3H and 3I illustrate sample user interfaces of the map system in which objects are selected and a list of selected objects 332 is displayed in the selection window, according to embodiments of the present disclosure. With reference to FIG. 3H, the list of features 332 indicates that the user has drilled down further into the selected features of FIG. 3G by selecting a subset of selected features consisting of only roads with speed limits of 20. Thus, the subset of the example of FIG. 3H includes the 163 features that are roads with speed limits of 20. The user has additionally selected to view the list of features 332 in the selection window (rather than the feature histogram). The list of features 332 lists each individual feature that is included in the currently selected subset. For example, the list includes S Central Av 334, among others.

In FIG. 3I, the user has selected feature Hamilton St at 336. In an embodiment, when a feature is selected from the list of features, the map interface automatically zooms to the location of that feature. The user may select the feature from the list of features by clicking on the name of the feature and/or the displayed thumbnail. In an embodiment, the map interface only zooms to the feature when the user clicks on, and/or selects, the thumbnail associated with the feature. In the example of FIG. 3I, the map interface is automatically zoomed to the location of the selected Hamilton St, and the selected feature is highlighted (338). Additionally, the name of the selected feature is shown in the feature information box 114. In an embodiment, the name of the selected feature is shown in the feature information box 114 when the user hovers the cursor over the thumbnail associated with the feature in the list of features. In an embodiment, the selected feature may be any other type of object, and may be outlined or otherwise highlighted when selected.

In various embodiments, the user of the map system may select either the list of features, or the feature histogram, of the selection window to view information about the selected features.

Figure 3J:
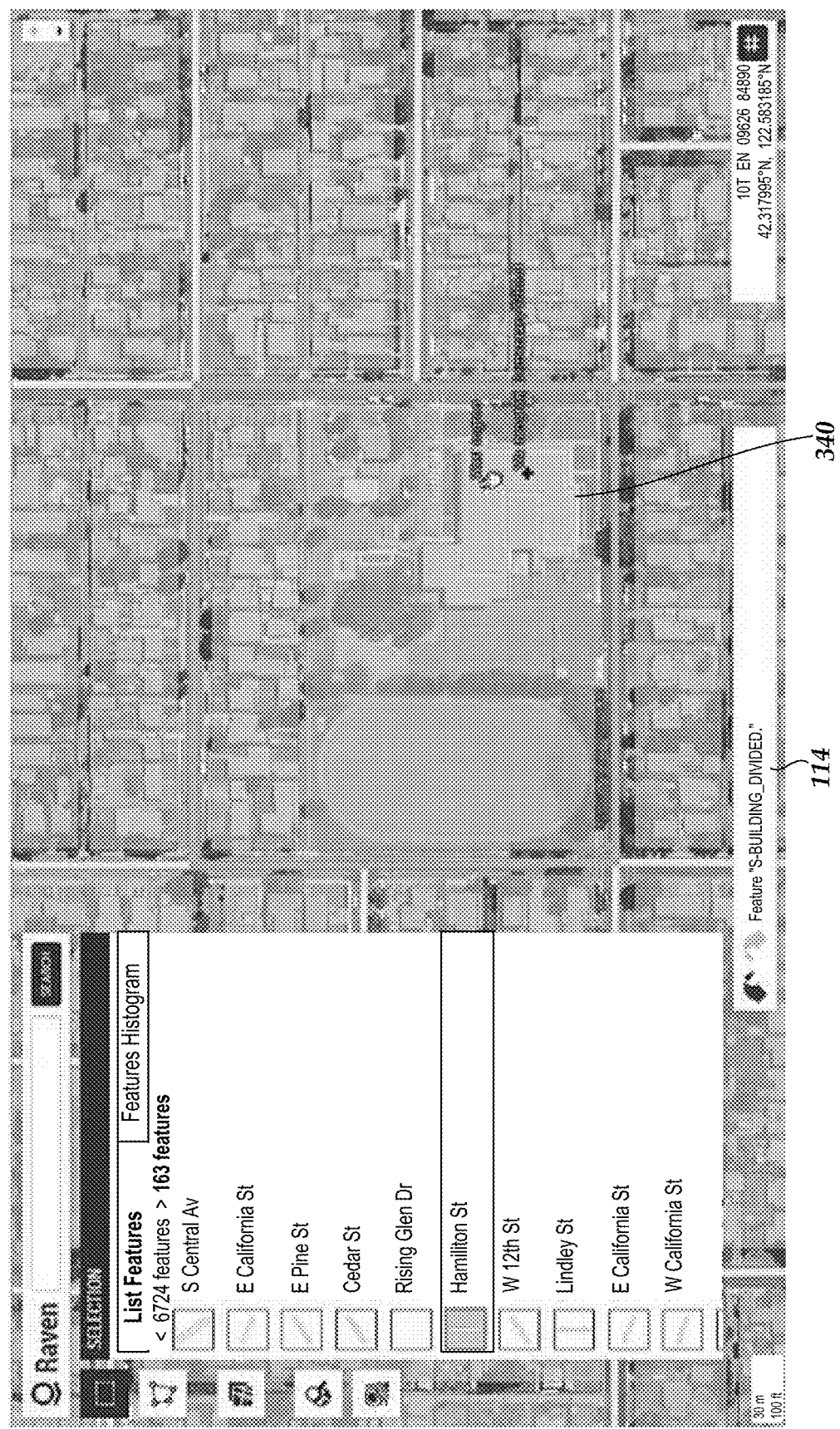
FIGS. 3J-3K illustrate sample user interfaces of the interactive data object map system in which objects are outlined when hovered over, according to embodiments of the present disclosure.
Figure 3K:
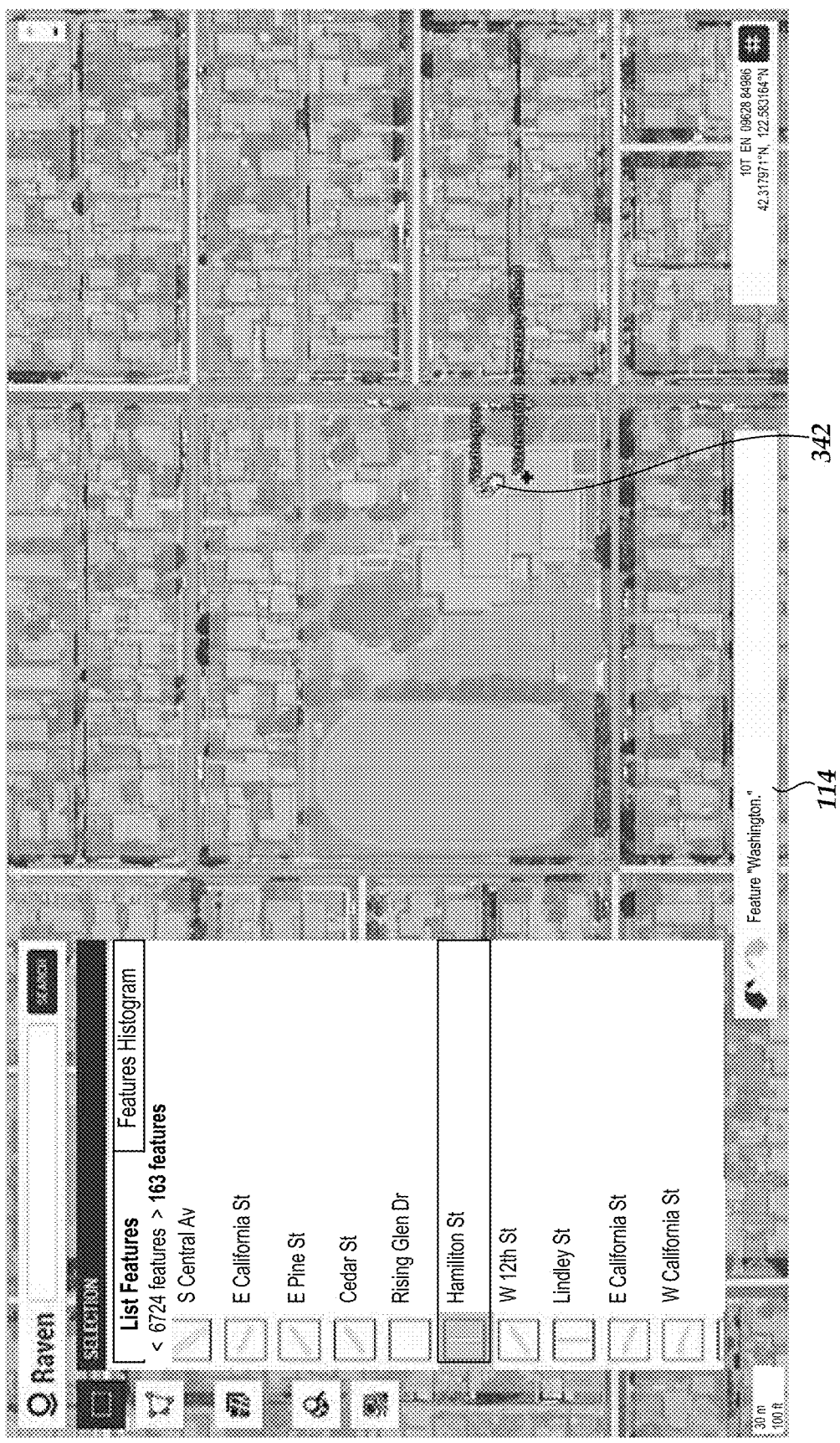

FIGS. 3J-3K illustrate sample user interfaces of the map system in which objects are outlined when hovered over, according to embodiments of the present disclosure. In FIG. 3J, the user is hovering over a building feature with the mouse cursor. The feature being hovered over is automatically outlined (340). Additionally, the name of the feature is displayed in the feature information box 114. In FIG. 3K, the user is hovering over a shelter feature with the mouse cursor. The feature being hovered over is automatically outlined (342), and the name of the feature is displayed in the feature information box 114. The user of the map system may, at any time, highlight and/or outline any feature/object by rolling over, hovering over, selecting, and/or touching that feature/object in the map interface.

In various embodiments, the user may select a feature in order to view a feature information window. The feature information window may include, for example, metadata associated with the selected feature. For example, the user may select a building feature, resulting in a display of information associated with that building feature such as the building size, the building name, and/or the building address or location, among others. Metadata associated with features/objects may include any information relevant to that feature/object. For example, metadata associated with a school may include an address (for example, 123 S. Orange Street), a district (for example, 509c), a grade level (for example, K-6), and/or a phone number (for example, 800-0000), among other items of metadata. In an embodiment, a history of the object, changes made to the object, and/or user notes related to the object, among other items, may be displayed. In an embodiment, a user may edit metadata associated with a selected feature.

Figure 4A:
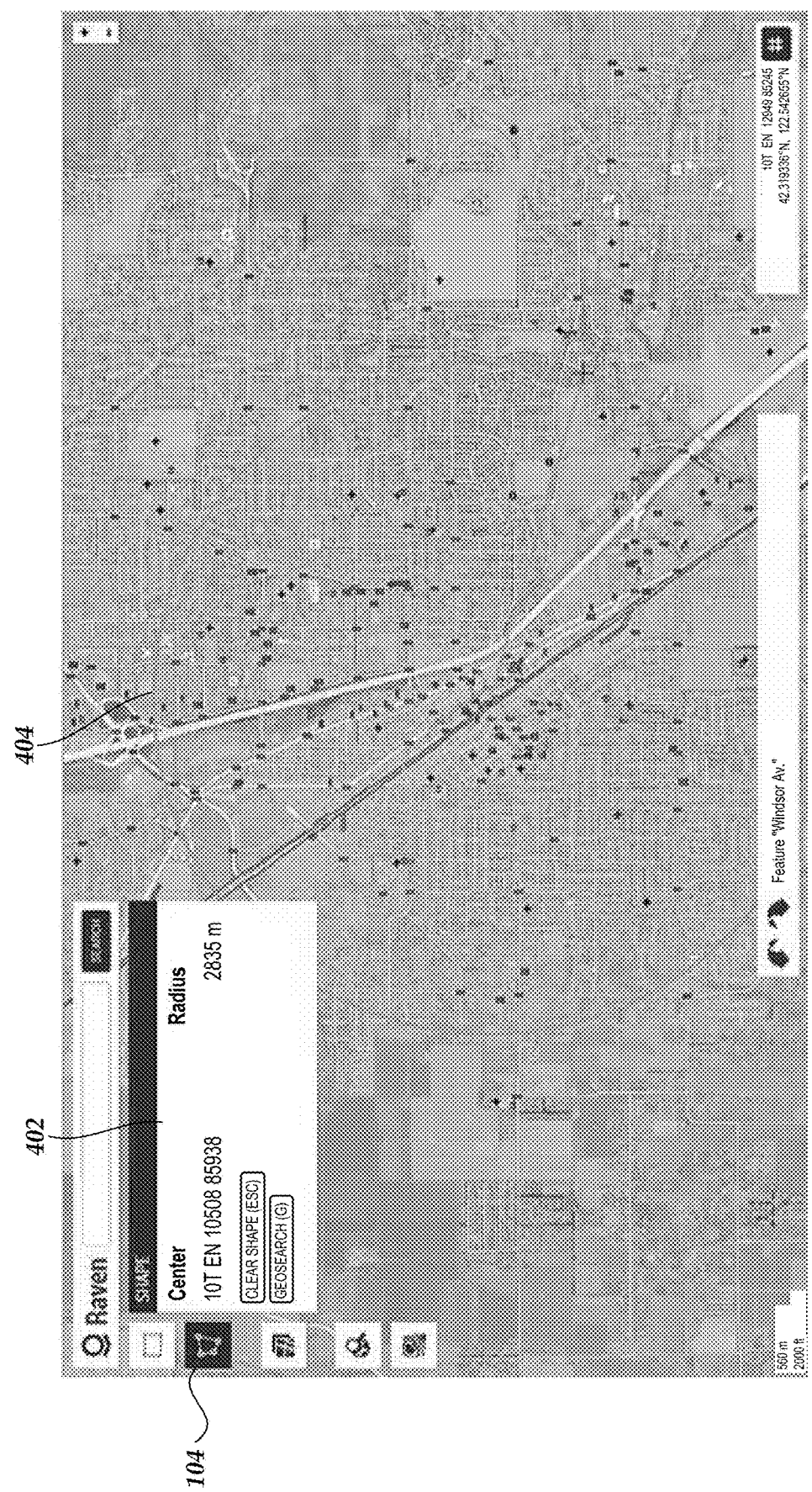
FIGS. 4A-4D illustrate sample user interfaces of the interactive data object map system in which a radius geosearch is displayed, according to embodiments of the present disclosure.

FIGS. 4A-4D illustrate sample user interfaces of the map system in which a radius geosearch is displayed, according to embodiments of the present disclosure. In FIG. 4A, the user has selected the shape button 104 and is drawing a circle selection 404 on the map interface by first selecting a center and then a radius. Shape window 402 indicates the coordinates of the center of the circle selection, as well as the radius of the circle selection. In various embodiments, any type of polygon or other shape may be drawn on the map interface to select features.

Figure 4B:
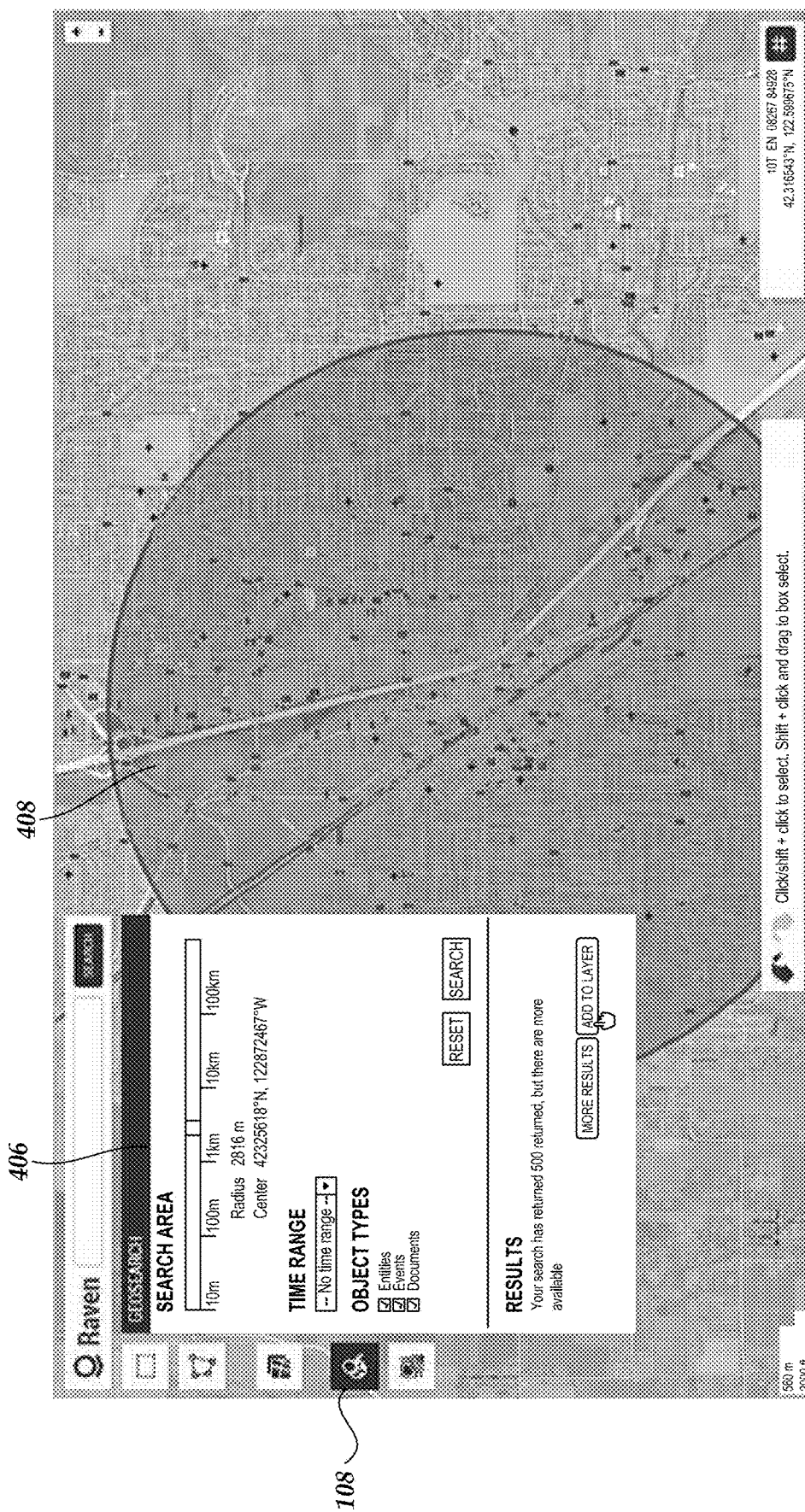

In FIG. 4B, the user has selected the geosearch button 108 so as to perform a geosearch within the selection circle 408. In an embodiment, a geosearch comprises a search through one or more databases of data objects, and metadata associated with those data objects, for any objects that meet the criteria of the geosearch. For example, a geosearch may search for any objects with geographic metadata and/or properties that indicate the object may be geographically within, for example, selection circle 408. A geosearch within a selected circle may be referred to as a radius search. Geosearch window 406 indicates various items of information related to the radius search, and includes various parameters that may be adjusted by the user. For example, the geosearch window 406 includes a search area slider that the user may slide to increase or decrease the radius of the selection circle 408. The user may also indicate a time range for the geosearch. In an embodiment, objects/features shown and/or searchable in the map system may include a time component and/or time metadata. Thus, for example, the user of the map system may specify a date or time period, resulting in the display of any objects/features with associated time metadata, for example, falling within the specified time period. In various embodiments, associated time metadata may indicate, for example, a time the feature was created, a time the feature was added to a database of features, a time the feature was previously added to a vector layer, a time the feature was last accessed by the map system and/or a user, a time the feature was built, and/or any combination of the foregoing. Alternatively, the user may select and/or search for objects/features within particular time periods, as shown in FIG. 4B. The geosearch window 406 also allows the user to specify the types of objects to be searched, for example, entities, events, and/or documents, among others.

In an embodiment, the user of the map system may perform a search by clicking and/or touching a search button. The map system may then perform a search of an object database for any objects matching the criteria specified in the geosearch. For example, in the example of FIG. 4B the map system will search for any objects with associated location information that falls within the selection circle 408. Objects searched by the map system may include objects other than those shown on the map interface. For example, in an embodiment the map system may access one or more databases of objects (and object metadata) that may be unrelated to the features currently shown in the map interface, or features related to the currently selected vector layers. The databases accessed may include databases external to any database storing data associated with the map system. Any objects found in the geosearch may then be made available to the user (as shown in FIG. 4B), and the user may be given the option of adding the objects to a new layer in the map interface (as shown in the geosearch information window 406).

Figure 4C:
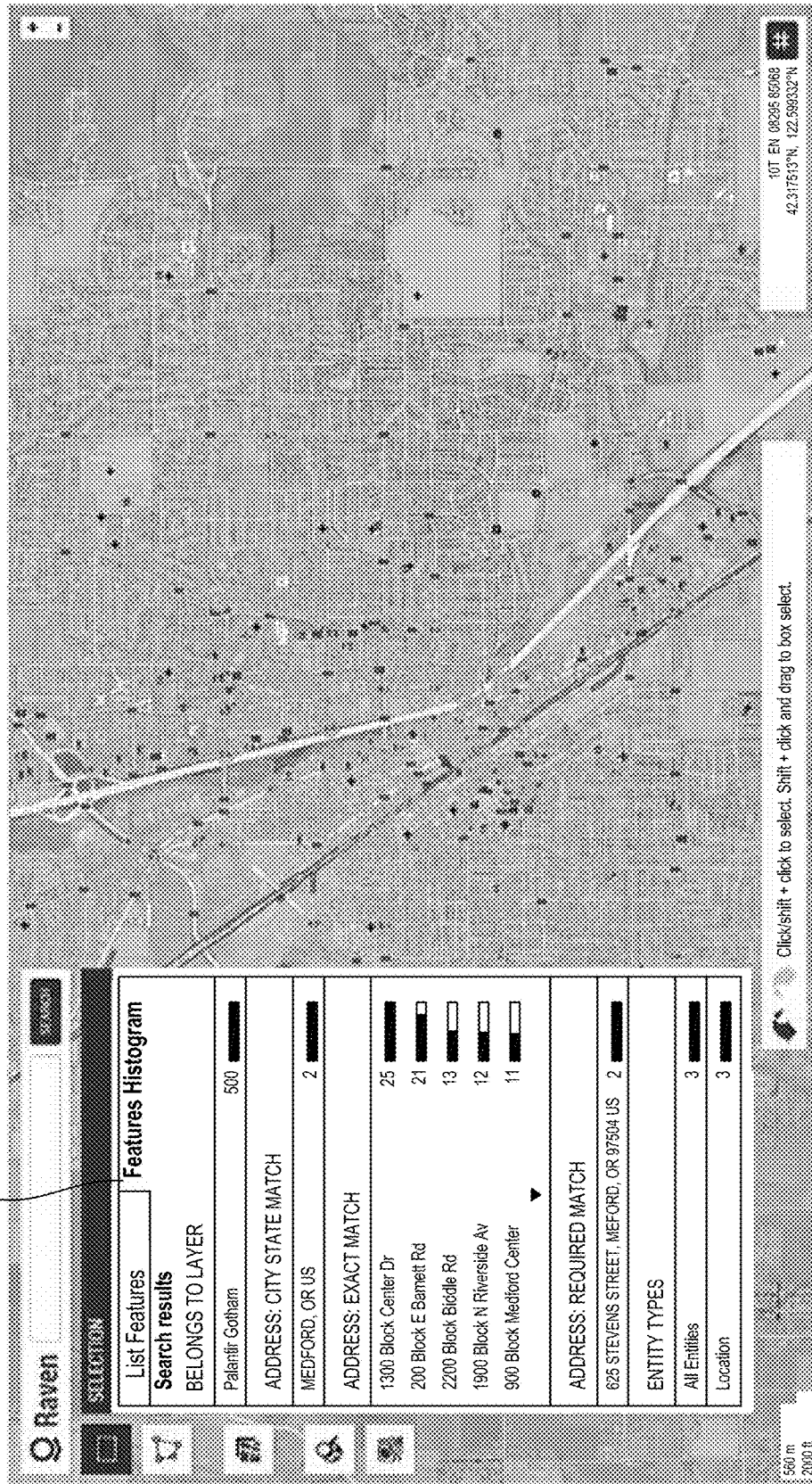
Figure 4D:
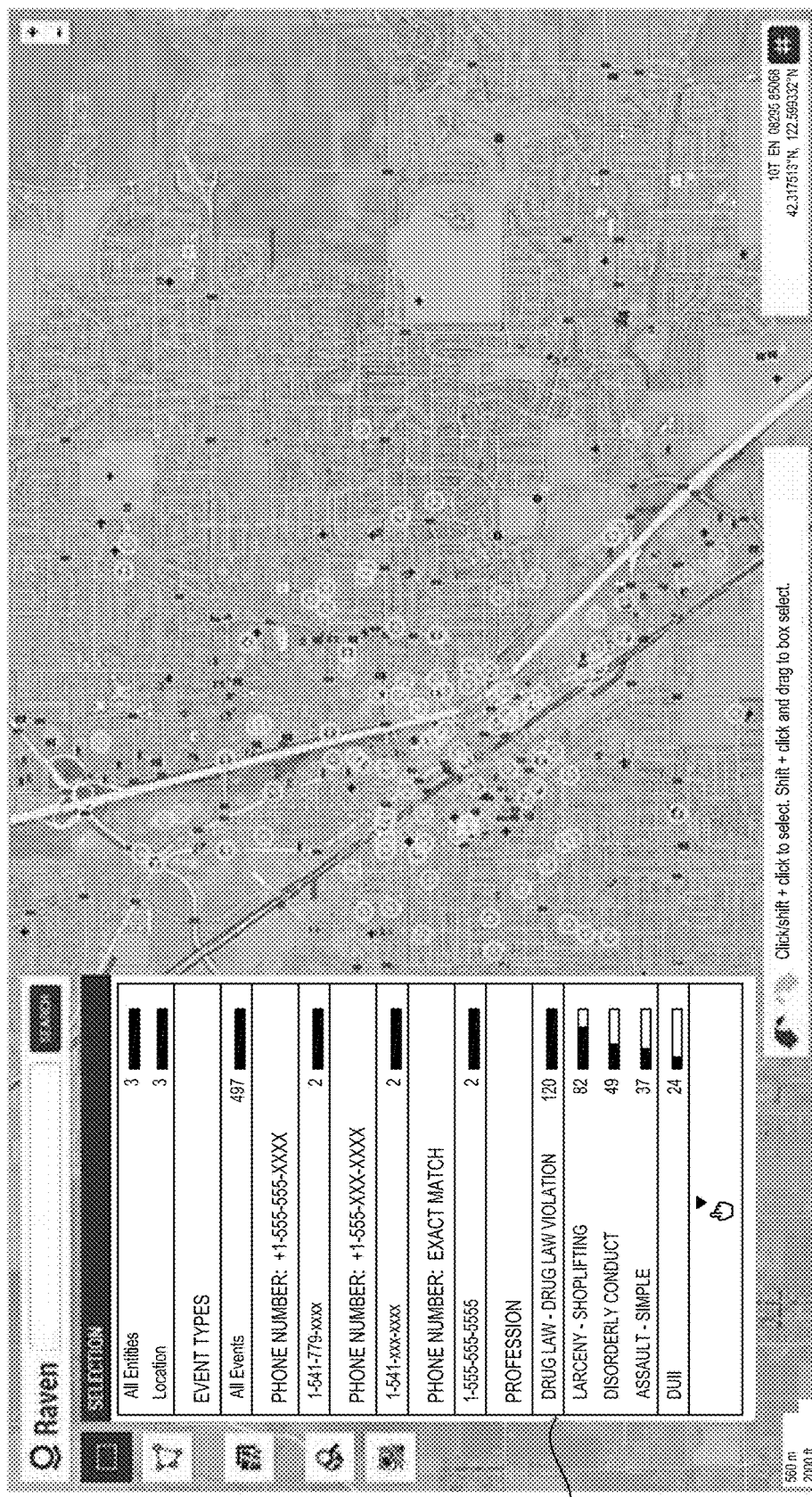

FIG. 4C shows objects added to the map interface following the geosearch in FIG. 4B. The search results are also shown in the feature histogram 410. In this example the returned objects include various entities and events. FIG. 4D shows the user has selected, in the feature histogram, all search result objects with related metadata indicating a drug law violation. Those selected objects are additionally highlighted in the map interface of FIG. 4D. In another example, geosearch may be used to determine, for example, that many crimes are concentrated in a downtown area of a city, while DUIs are more common in areas with slow roads.

Figure 5A:
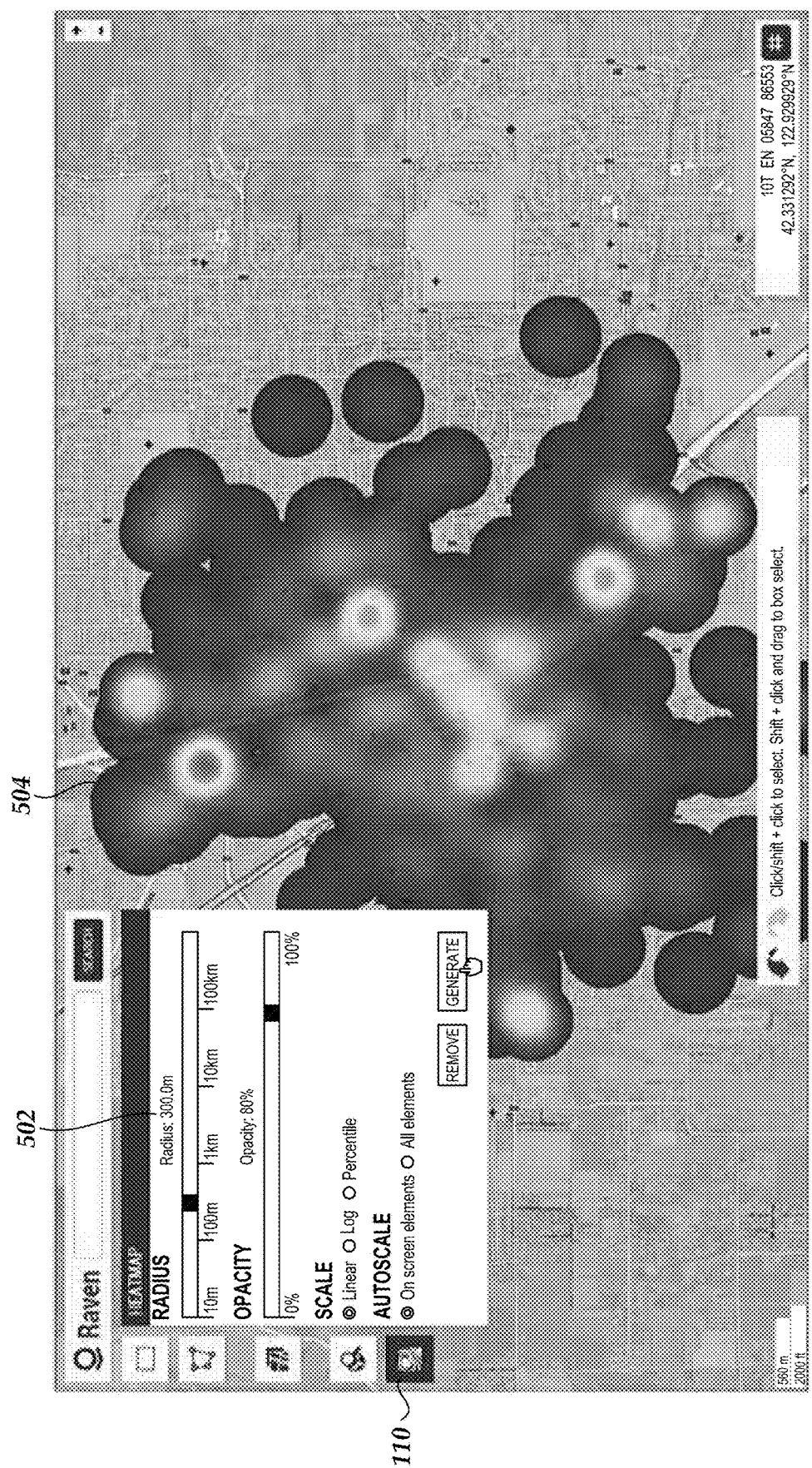
FIGS. 5A-5D illustrate sample user interfaces of the interactive data object map system in which a heatmap is displayed, according to embodiments of the present disclosure.
Figure 5B:
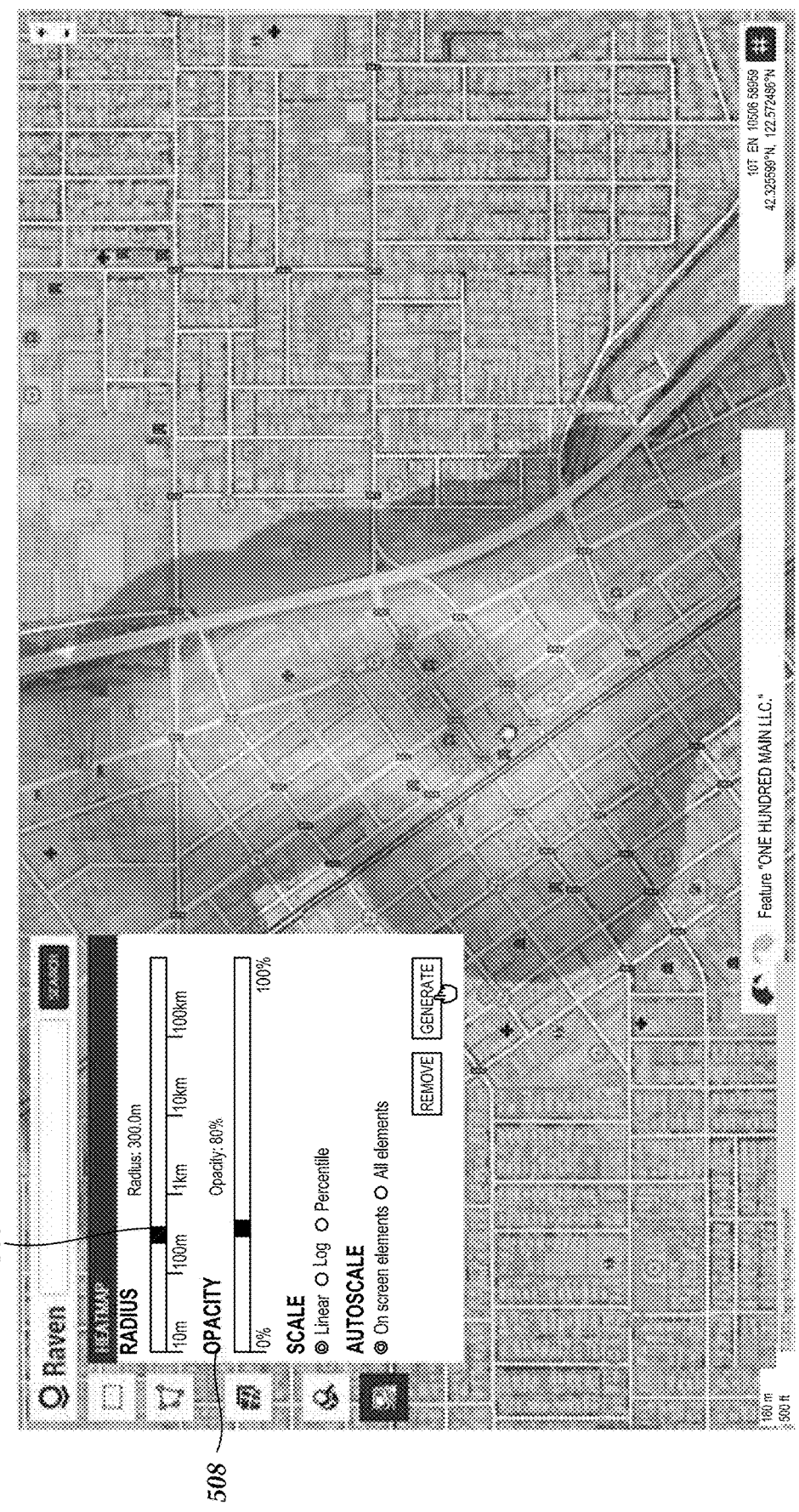

FIGS. 5A-5D illustrate sample user interfaces of the map system in which a heatmap is displayed, according to embodiments of the present disclosure. In FIG. 5A, the user has selected the heatmap button 110 so as to create a heatmap 504 based on the objects selected in FIG. 4D. A heatmap information window 502 is displayed in which the user may specify various parameters related to the generation of heatmap. For example, referring now to FIG. 5B, the user may adjust a radius (506) of the circular heatmap related to each selected object, an opacity (508) of the heatmap, a scale of the heatmap, and an auto scale setting. In FIG. 5B, the user has decreased the opacity of the generated heatmap and zoomed in on the map interface so as to more clearly view various objects and the underlying map tiles.

Figure 5C:
Figure 5D:
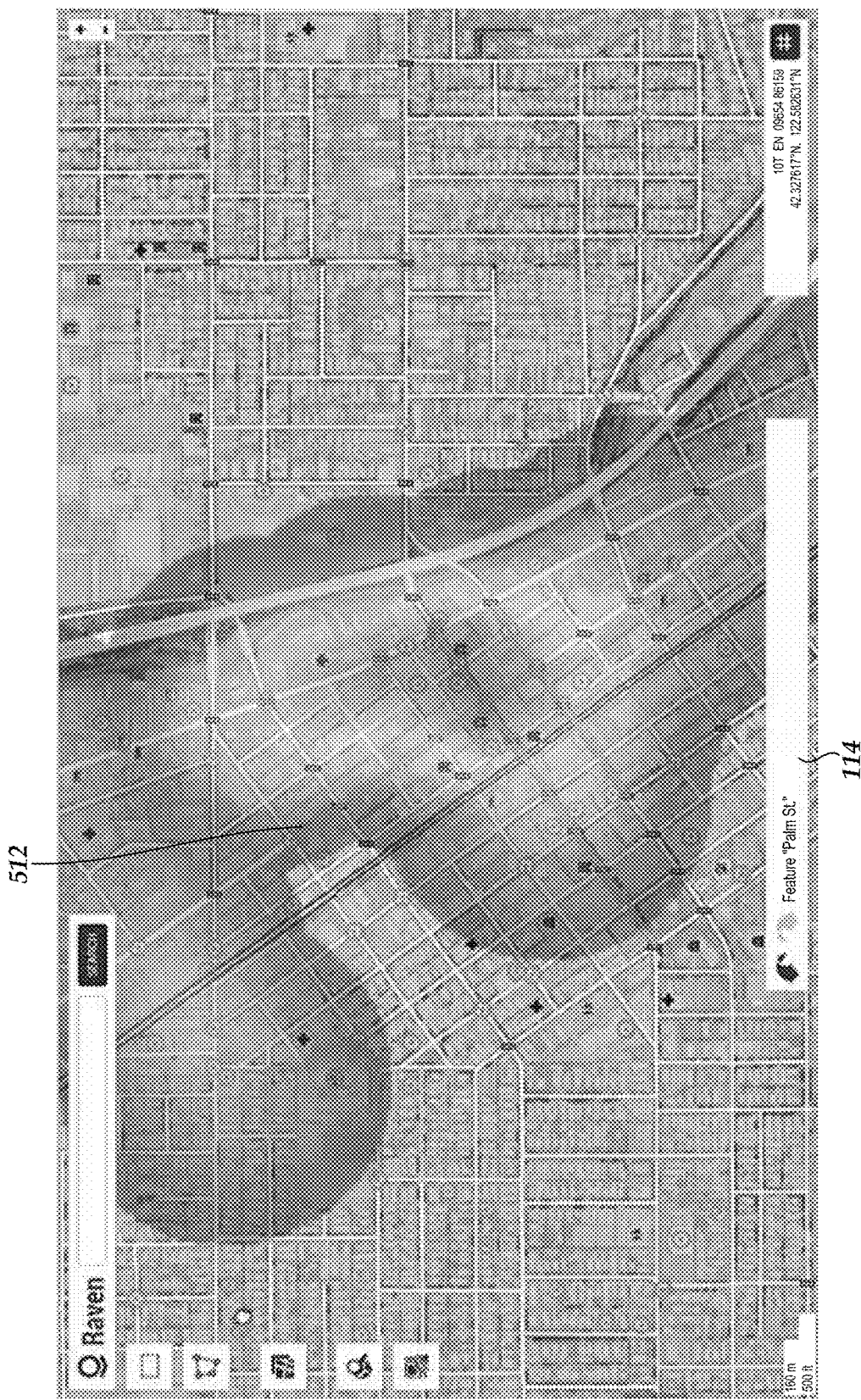

FIG. 5C shows the user selecting various objects and/or features while the heatmap is displayed using the rectangle selection tool, such as to view information regarding the features in a histogram. FIG. 5D shows the selected objects, selected in FIG. 5C, now highlighted (512).

In the map system a heatmap may be generated on any object type, and/or on multiple object types. In an embodiment, different heatmap radiuses may be set for different object types. For example, the user may generate a heatmap in which streetlights have a 20 m radius, while hospitals have a 500 m radius. In an embodiment, the heatmap may be generated based on arbitrary shapes. For example, rather than a circular-based heatmap, the heatmap may be rectangular-based or ellipse-based. In an embodiment, the heatmap may be generated based on error ellipses and/or tolerance ellipses. A heatmap based on error ellipses may be advantageous when the relevant objects have associated error regions. For example, when a location of an object is uncertain, or multiple datapoints associated with an object are available, an error ellipse may help the user determine the actual location of the object.

Figure 5E:
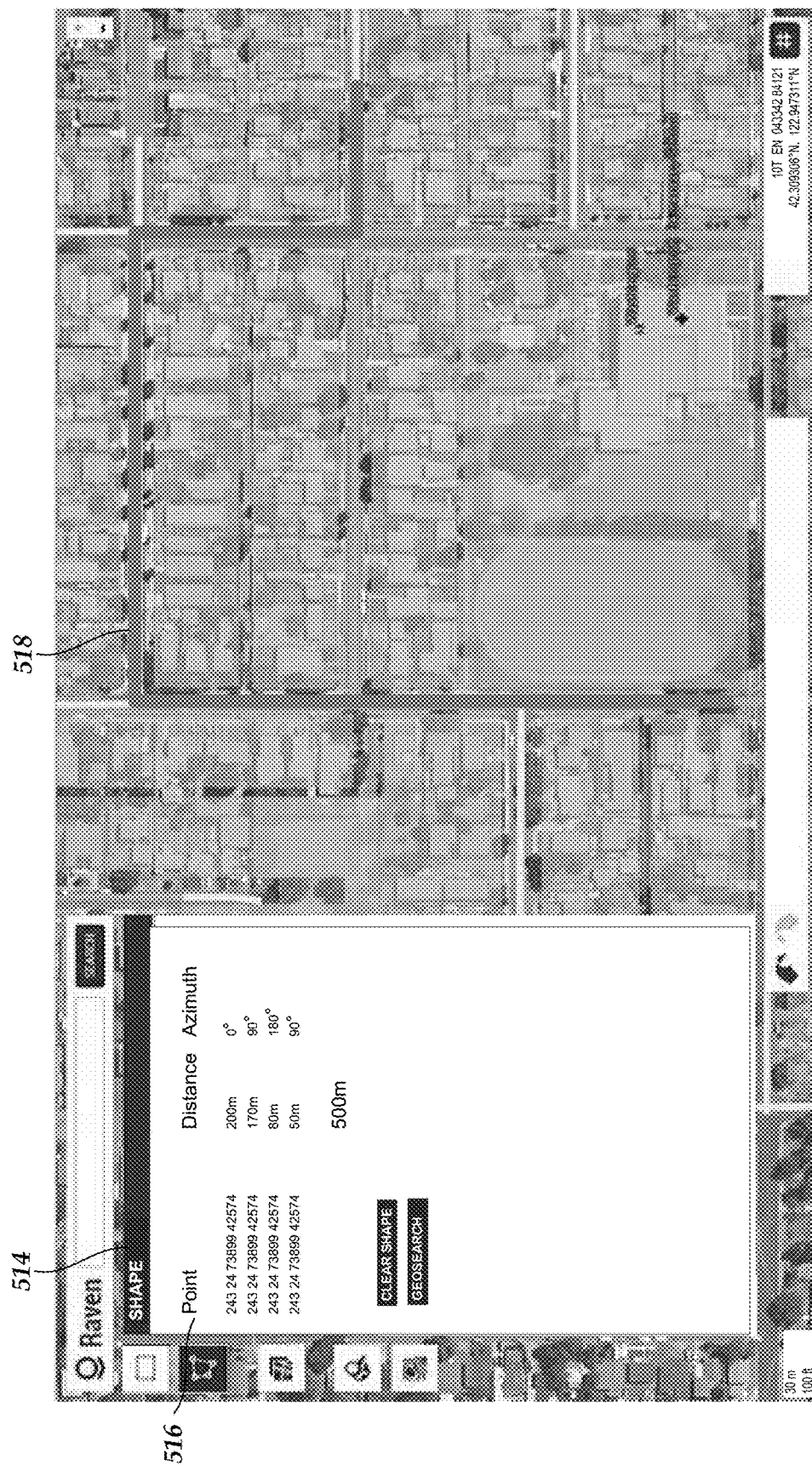
FIGS. 5E-5F illustrate sample user interfaces of the interactive data object map system in which a shape-based geosearch is displayed, according to embodiments of the present disclosure.
Figure 5F:
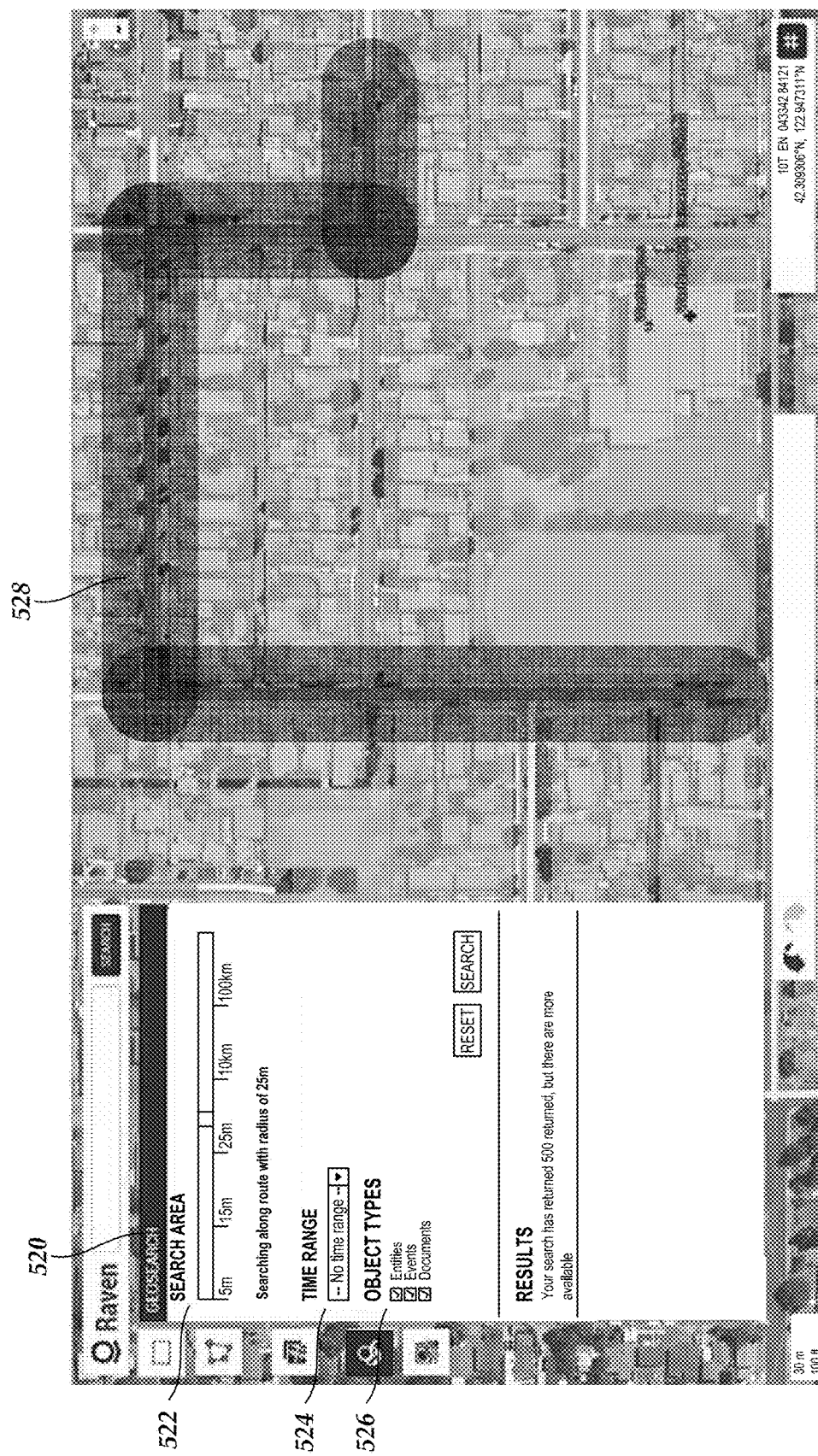

FIGS. 5E-5F illustrate sample user interfaces of the map system in which a shape-based geosearch is displayed, according to embodiments of the present disclosure. In FIG. 5E, the user has selected the shape button 104, and a shape information window 514 is shown. In the user interface of FIG. 5E the user has drawn lines 518, however any shapes may be drawn on the map interface. Information related to the drawn lines 518 is displayed in the shape information window 514. For example, at 516 the starting points, distance, and azimuth related to each line are displayed. Further, a total distance from the start to the end of the line is shown.

FIG. 5F shows a geosearch performed on the line shape drawn in FIG. 5E. Geosearch information window 520 indicates a search area 522, a time range 524, and an object type 526 as described above with reference to FIG. 4B. The search area is indicated on the map interface by the highlighted area 528 along the drawn line. The geosearch may be performed, and results may be shown, in a manner similar to that described above with reference to FIGS. 4B-4D. For example, geosearch along a path may be used to determine points of interest along that path.

Figure 5G:
FIG. 5G illustrates a sample user interface of the interactive data object map system in which a keyword object search is displayed, according to an embodiment of the present disclosure.

FIG. 5G illustrates a sample user interface of the map system in which a keyword object search is displayed, according to an embodiment of the present disclosure. The user may type words, keywords, numbers, and/or geographic coordinates, among others, into the search box 112. In FIG. 5G, the user has typed Bank (530). As the user types, the map system automatically searches for objects and/or features that match the information typed. Matching may be performed based on object data and/or metadata. Search results are displayed as shown at 532 in FIG. 5G. In the example, a list of banks (bank features) is shown. The user may then select from the list shown, at which point the map system automatically zooms to the selected feature and indicates the selected feature with an arrow 534. In various embodiments, the selected feature may be indicated by highlighting, outlining, and/or any other type of indicator. In an embodiment, the search box 112 may be linked to a gazetteer so as to enable simple word searches for particular geographic locations. For example, a search for a city name, New York, may be linked with the geographic coordinates of the city, taking the user directly to that location on the map interface.

Figure 5H:
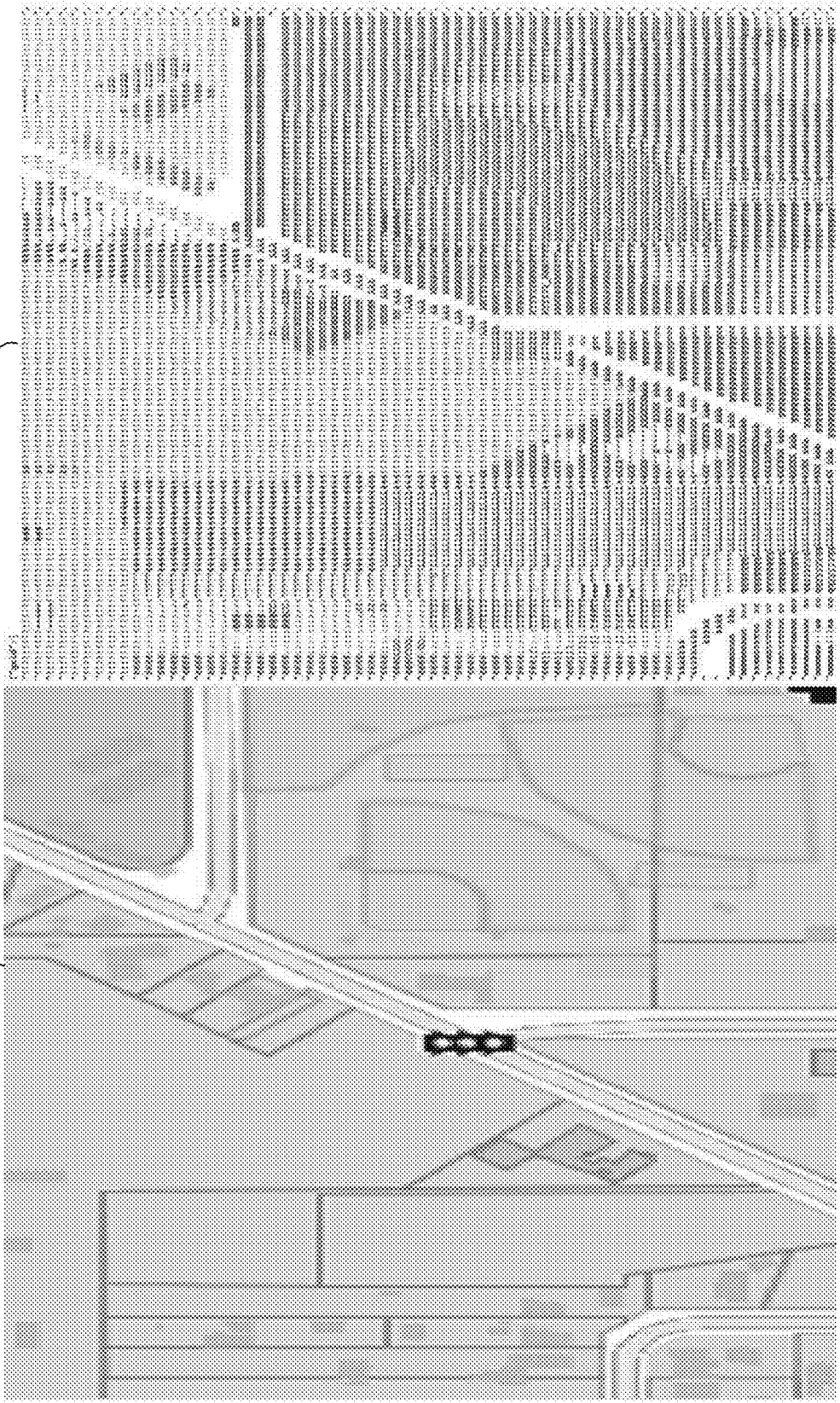
FIG. 5H illustrates an example of a UTF grid of the interactive data object map system, according to an embodiment of the present disclosure.

FIG. 5H illustrates an example of a UTF grid of the map system, according to an embodiment of the present disclosure. In an embodiment, the UTF grid enables feature outlining and/or highlighting of many objects with client-side components. In one embodiment, each map tile (or image) of the map interface includes an associated textual UTF (UCS Transformation Format) grid. In FIG. 5H, an example map tile 526 is shown next to an associated example UTF grid 538. In this example, the map tile and associated UTF grid are generated by the server-side components and sent to the client-side components. In the UTF grid, each character represents a pixel in the map tile image, and each character indicates what feature is associated with the pixel. Each character in the UTF grid may additionally be associated with a feature identifier which may be used to request metadata associated with that feature.

Contiguous regions of characters in the UTF grid indicate the bounds of a particular feature, and may be used by the client-side components to provide the feature highlighting and/or outlining. For example, when a user hovers a mouse pointer over a feature on a map tile, the map system determines the character and portion of the UTF grid associated with the pixel hovered over, draws a feature outline based on the UTF grid, and may additionally access metadata associated with the feature based on the feature identifier associated with the feature. In an embodiment, the UTF grid is sent to the client-side components in a JSON (JavaScript Object Notation) format.

Figure 6A:
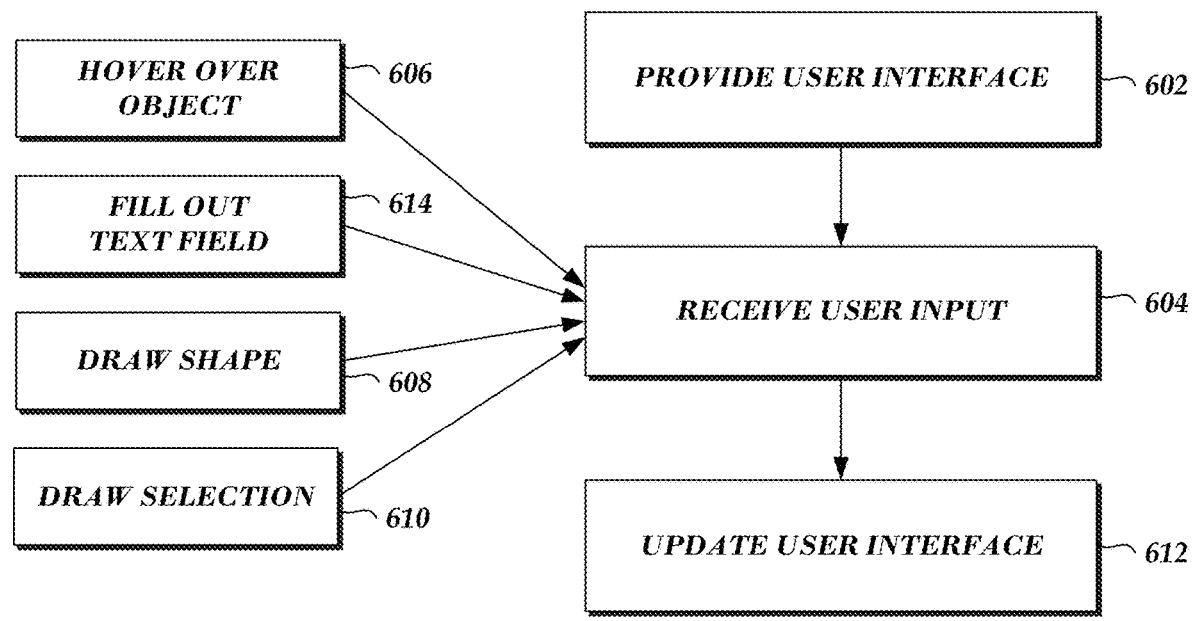
FIG. 6A shows a flow diagram depicting illustrative client-side operations of the interactive data object map system, according to an embodiment of the present disclosure.

FIG. 6A shows a flow diagram depicting illustrative client-side operations of the map system, according to an embodiment of the present disclosure. In various embodiments, fewer blocks or additional blocks may be included in the process, or various blocks may be performed in an order different from that shown in FIG. 6A. In an embodiment, one or more blocks in FIG. 6A may be performed by client-side components of the map system, for example, computer system 800 (described below in reference to FIG. 8D).

At block 602, the map system provides a user interface (for example, the user interface of FIG. 1) to the user. As described above and below, the user interface may be provided to the user through any electronic device, such as a desktop computer, a laptop computer, a mobile smartphone, and/or a tablet, among others. At block 604, an input is received from the user of the map system. For example, the user may use a mouse to roll over and/or click on an item of the user interface, or the user may touch the display of the interface (in the example of a touch screen device).

Inputs received from the user may include, for example, hovering over, rolling over, and/or touching and object in the user interface (606); filling out a text field (614); drawing a shape in the user interface (608), and/or drawing a selection box and/or shape in the user interface (610); among other actions or inputs as described above.

At block 612, any of inputs 606, 614, 608, and 610 may cause the map system to perform client-side actions to update the user interface. For example, hovering over an object (606) may result in the client-side components of the map system to access the UTF grid, determine the boundaries of the object, and draw an outline around the hovered-over object. In another example, filling out a text field (614) may include the user inputting data into the map system. In this example, the user may input geographic coordinates, metadata, and/or other types of data to the map system. These actions may result in, for example, the client-side components of the map system storing the inputted data and/or taking an action based on the inputted data. For example, the user inputting coordinates may result in the map interface being updated to display the inputted information, such as an inputted name overlaying a particular object. In yet another example, the actions/inputs of drawing a shape (608) and/or drawing a selection (610) may result in the client-side components of the map system to update the user interface with colored and/or highlighted shapes (see, for example, FIG. 3A).

In an embodiment, one or more blocks in FIG. 6A may be performed by server-side components of the map system, for example, server 830 (described below in reference to FIG. 8D).

Figure 6B:
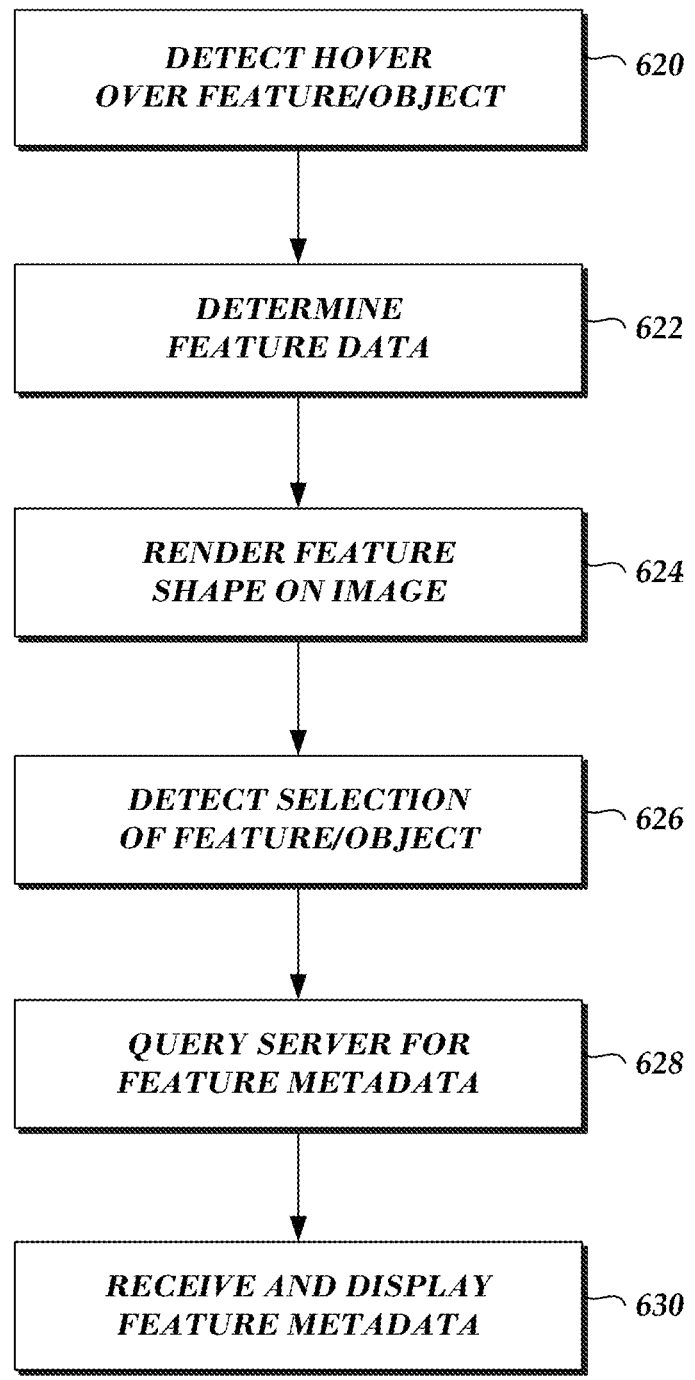
FIG. 6B shows a flow diagram depicting illustrative client-side metadata retrieval of the interactive data object map system, according to an embodiment of the present disclosure.

FIG. 6B shows a flow diagram depicting illustrative client-side metadata retrieval of the map system, according to an embodiment of the present disclosure. In various embodiments, fewer blocks or additional blocks may be included in the process, or various blocks may be performed in an order different from that shown in FIG. 6B. In an embodiment, one or more blocks in FIG. 6B may be performed by client-side components of the map system, for example, computer system 800.

At block 620, the client-side components of the map system detect that the user is hovering over and/or touching an object in the user interface. At block 622, and as described above, the client-side components may access the UTF grid to determine the feature identifier and object boundaries associated with the hovered-over object. Then, at block 624, the client-side components may render the feature shape on the image or map interface. The feature shape may be rendered as an outline and/or other highlighting.

At block 636, the client-side components detect whether the user has selected the object. Objects may be selected, for example, if the user clicks on the object and or touches the object. If the user has selected the object, then at block 628, the client-side components query the server-side components to retrieve metadata associated with the selected object. In an embodiment, querying of the server-side components may include transmitting the feature identifier associated with the selected object to the server, the server retrieving from a database the relevant metadata, and the server transmitting the retrieved metadata back to the client-side components.

At block 630, the metadata is received by the client-side components and displayed to the user. For example, the metadata associated with the selected object may be displayed to the user in the user interface in a dedicated metadata window, among other possibilities.

In an embodiment, one or more blocks in FIG. 6B may be performed by server-side components of the map system, for example, server 830.

Figure 7A:
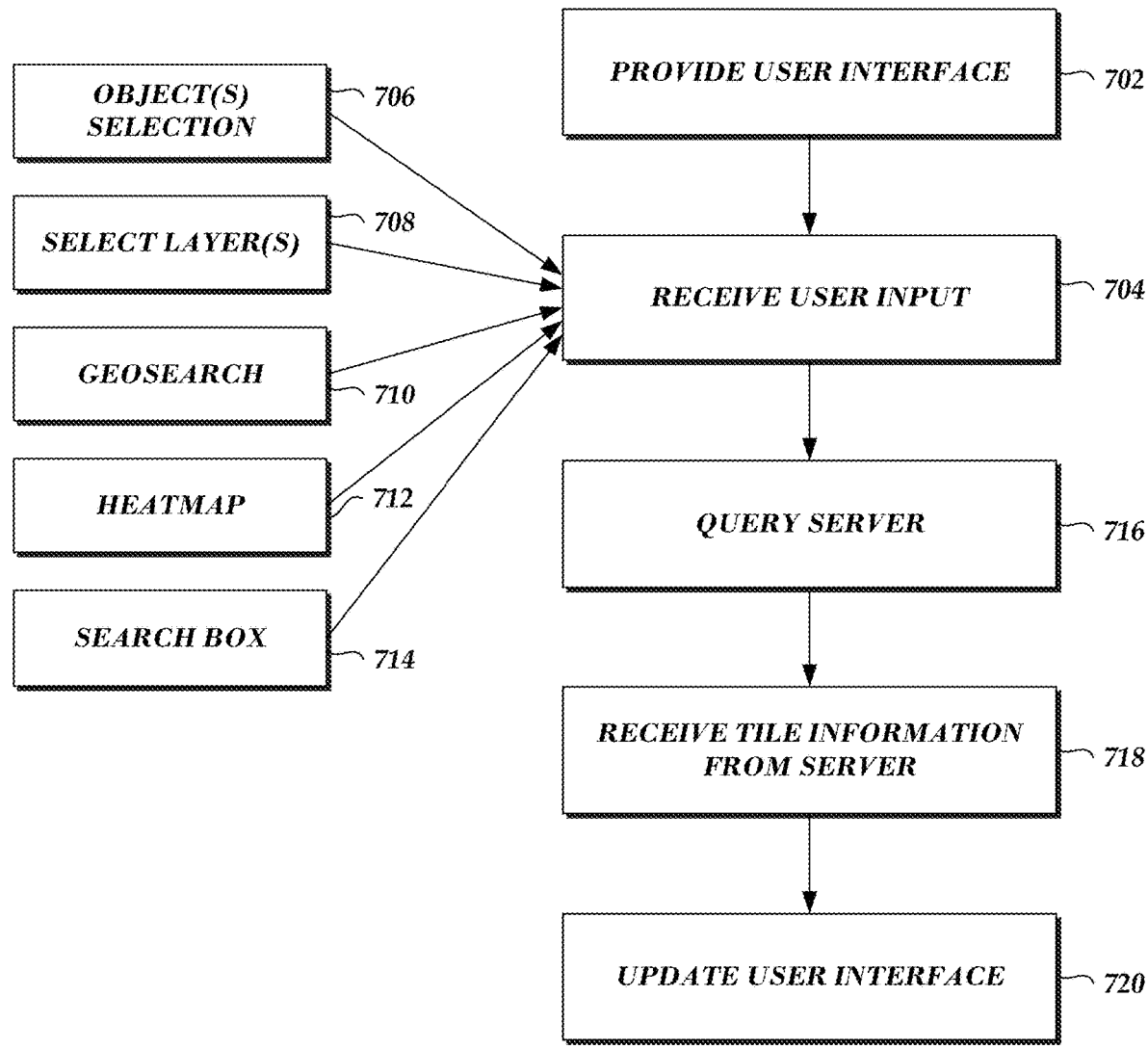
FIG. 7A shows a flow diagram depicting illustrative server-side operations of the interactive data object map system, according to an embodiment of the present disclosure.

FIG. 7A shows a flow diagram depicting illustrative server-side operations of the map system, according to an embodiment of the present disclosure. In various embodiments, fewer blocks or additional blocks may be included in the process, or various blocks may be performed in an order different from that shown in FIG. 7A. In an embodiment, one or more blocks in FIG. 7A may be performed by server-side components of the map system, for example, server 830.

Server-side operations of the map system may include composing and updating the map tiles that make up the map interface. For example, when the user changes the selection of the base layer and/or one or more of the vector layers, the map tiles are re-composed and updated in the map interface to reflect the user's selection. Selection of objects resulting in highlighting of those objects may also involve re-composition of the map tiles. Further, UTF grids may be generated by the server-side components for each map tile composed.

At block 702, the user interface is provided to the user. At block 704 an input from the user is received. Inputs received from the user that may result in server-side operations may include, for example, an object selection (706), a change in layer selection (708), a geosearch (710), generating a heatmap (712), searching from the search box (714), and/or panning or zooming the map interface, among others.

At block 716, the client-side components of the map system may query the server-side components in response to any of inputs 706, 708, 710, 712, and 714 from the user. The server-side components then update and re-compose the map tiles and UTF grids of the map interface in accordance with the user input (as described below in reference to FIG. 7B), and transmits those updated map tiles and UTF grids back to the client-side components.

At block 718, the client-side components receive the updated map tile information from the server, and at block 720 the user interface is updated with the received information.

In an embodiment, additional information and/or data, in addition to updated map tiles, may be transmitted to the client-side components from the server-side components. For example, object metadata may be transmitted in response to a user selecting an object.

In an embodiment, one or more blocks in FIG. 7A may be performed by client-side components of the map system, for example, computer system 800.

Figure 7B:
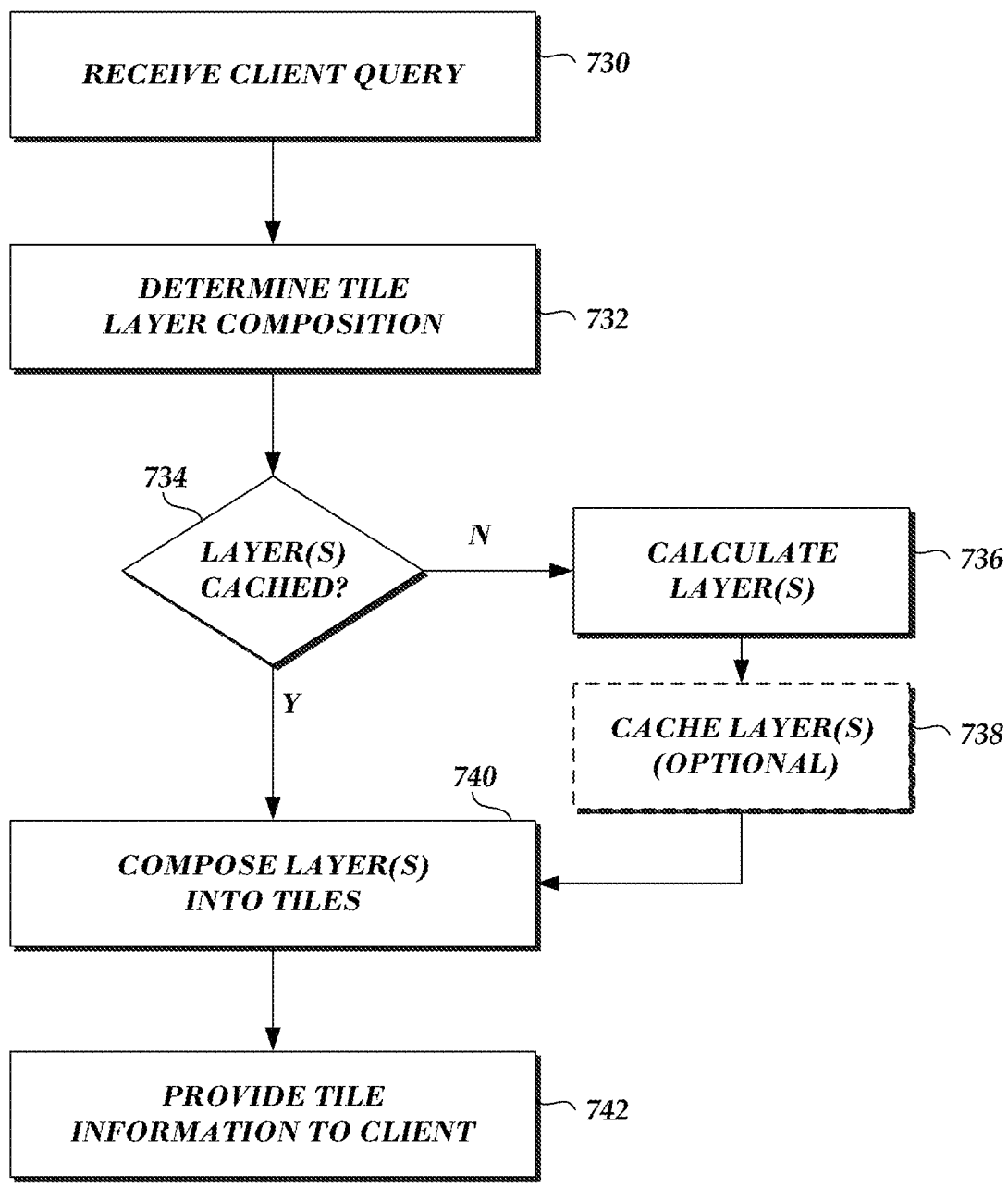
FIG. 7B shows a flow diagram depicting illustrative server-side layer composition of the interactive data object map system, according to an embodiment of the present disclosure.

FIG. 7B shows a flow diagram depicting illustrative server-side layer composition of the map system, according to an embodiment of the present disclosure. In various embodiments, fewer blocks or additional blocks may be included in the process, or various blocks may be performed in an order different from that shown in FIG. 7B. In an embodiment, one or more blocks in FIG. 7B may be performed by server-side components of the map system, for example, server 830.

At block 730, a query is received by the server-side components from the client-side components. Such a query may originate, for example, at block 716 of FIG. 7A. At block 732, the server-side components determine the map tile composition based on the query. For example, if the user has selected an object or group of objects, the map tiles containing those objects may be updated to include highlighted objects. In another example, if the user has changed the layer selection, the map tiles may be updated to include only those layers that are currently selected. In the example of FIG. 7B, the layers currently selected are determined, and the layers are composed and/or rendered into the map tiles. In another example, if the user has performed a geosearch and selected to add the search result objects to the map interface, the map tiles are updated to include those search result objects. In yet another example, when the user has generated a heatmap, the map tiles are updated to show the generated heatmap. In another example, if the user searches via the search box, the selected objects may be highlighted in the re-composed map tiles. In another example, when the user pans and/or zooms in the map interface, the map tiles are updated to reflect the new view selected by the user. In all cases, and updated UTF grid may also be generated for each composed map tile.

At block 734, the map system determines whether the layers necessary to compose the requested map tiles are cached. For example, when a layer is selected by the user, that layer may be composed by the map system and placed in a memory of the server-side components for future retrieval. Caching of composed layers may obviate the need for recomposing those layers later, which advantageously may save time and/or processing power.

If the required layers are cached, then at block 740 the layers are composed into the requested map tiles and, at block 742, transmitted to the client-side components.

When the required layers are not cached, at block 736, the server-side components calculate and/or compose the requested layer and or layers, and may then, at block 738, optionally cache the newly composed layers for future retrieval. Then, at blocks 740 and 742, the layers are composed into map tiles and provided to the client-side components.

In an embodiment, entire map tiles may be cached by the server-side components. In an embodiment, the size and/or quality of the map tiles that make up that map interface may be selected and/or dynamically selected based on at least one of: the bandwidth available for transmitting the map tiles to the client-side components, the size of the map interface, and/or the complexity of the layer composition, among other factors. In an embodiment, the map tiles comprise images, for example, in one or more of the following formats: PNG, GIF, JPEG, TIFF, BMP, and/or any other type of appropriate image format.

In an embodiment, the layer and object data composed into layers and map tiles comprises vector data. The vector data (for example, object data) may include associated metadata, as described above. In an embodiment, the vector, layer, and/or object data and associated metadata may originate from one or more databases and/or electronic data stores.

In an embodiment, one or more blocks in FIG. 7B may be performed by client-side components of the map system, for example, computer system 800.

In an embodiment, the map system may display more than 50 million selectable features to a user simultaneously. In an embodiment, the map system may support tens or hundreds of concurrent users accessing the same map and object data. In an embodiment, map and object data used by the map system may be mirrored and/or spread across multiple computers, servers, and/or server-side components.

In an embodiment, rather than updating the map tiles to reflect a selection by the user of one or more objects, the map system may show an approximation of the selection to the user based on client-side processing.

In an embodiment, a user may drag and drop files, for example, vector data and/or vector layers, onto the user interface of the map system, causing the map system to automatically render the file in the map interface.

In an embodiment, icons and/or styles associated with various objects in the map interface may be updated and/or changed by the user. For example, the styles of the various objects may be specified in or by a style data file. The style data file may be formatted according to a particular format or standard readable by the map system. In an embodiment, the style data file is formatted according to the JSON format standard. The user may thus change the look of the objects and shapes rendered in the map interface of the map system by changing the style data file. The style data file may further define the looks for object and terrain (among other items and data) at various zoom levels.

In an embodiment, objects, notes, metadata, and/or other types of data may be added to the map system by the user through the user interface. In an embodiment, user added information may be shared between multiple users of the map system. In an embodiment, a user of the map system may add annotations and shapes to the map interface that may be saved and shared with other users. In an embodiment, a user of the map system may share a selection of objects with one or more other users.

In an embodiment, the user interface of the map system may include a timeline window. The timeline window may enable the user to view objects and layers specific to particular moments in time and/or time periods. In an embodiment, the user may view tolerance ellipses overlaid on the map interface indicating the likely position of an object across a particular time period.

In an embodiment, the map system may include elevation profiling. Elevation profiling may allow a user of the system to determine the elevation along a path on the map interface, to perform a viewshed analysis (determine objects and/or terrain viewable from a particular location), to perform a reverse-viewshed analysis (for a particular location, determine objects and/or terrain that may view the location), among others.

In an embodiment, vector data, object data, metadata, and/or other types of data may be prepared before it is entered into or accessed by the map system. For example, the data may be converted from one format to another, may be crawled for common items of metadata, and/or may be prepared for application of a style file or style information, among other action. In an embodiment, a layer ontology may be automatically generated based on a group of data. In an embodiment, the map system may access common data sources available on the Internet, for example, road data available from openstreetmap.org.

In an embodiment, roads shown in the map interface are labeled with their names, and buildings are rendered in faux-3D to indicate the building heights. In an embodiment, Blue Force Tracking may be integrated into the map system as a layer with the characteristics of both a static vector layer and a dynamic selection layer. A Blue Force layer may enable the use of the map system for live operational analysis. In an embodiment, the map system may quickly render detailed chloropleths or heatmaps with minimal data transfer. For example, the system may render a chloropleth with a property value on the individual shapes of the properties themselves, rather than aggregating this information on a county or zip code level.

Advantageously, the map system displays many items of data, objects, features, and/or layers in a single map interface. A user may easily interact with things on the map and gather information by hovering over or selecting features, even though those features may not be labeled. The user may select features, may "drill down" on a particular type of feature (for example, roads), may view features through histograms, may use histograms to determine common characteristics (for example, determine the most common speed limit), and/or may determine correlations among features (for example, see that slower speed limit areas are centered around schools). Further, the map system may be useful in many different situations. For example, the system may be useful to operational planners and/or disaster relief personnel.

Additionally, the map system accomplishes at least three core ideas: providing a robust and fast back-end (server-side) renderer, keeping data on the back-end, and only transferring the data necessary to have interactivity. In one embodiment, the primary function of the server-side components is rendering map tiles. The server is capable of drawing very detailed maps with a variety of styles that can be based on vector metadata. Rendered map tiles for a vector layer are cached, and several of these layer tiles are drawn on top of one another to produce the final tile that is sent to the client-side browser. Map tile rendering is fast enough for displaying dynamic tiles for selection and highlight to the user. Server-side operations allow for dynamic selections of very large numbers of features, calculation of the histogram, determining the number of items shown and/or selected, and drawing the selection, for example. Further, the heatmap may include large numbers of points without incurring the cost of transferring those points to the client-side browser. Additionally, transferring only as much data as necessary to have interactivity enables quick server rendering of dynamic selections and vector layers. On the other hand, highlighting hovered-over features may be performed client-side nearly instantaneously, and provides useful feedback that enhances the interactivity of the map system. In an embodiment, to avoid transferring too much geometric data, the geometries of objects (in the map tiles and UTF grid) are down-sampled depending on how zoomed in the user is to the map interface. Thus, map tiles may be rendered and presented to a user of the map system in a dynamic and useable manner.

Object Centric Data Model

To provide a framework for the following discussion of specific systems and methods described above and below, an example database system 1210 using an ontology 1205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 1205. The conceptual data model is independent of any particular database used for durably storing one or more database(s) 1209 based on the ontology 1205. For example, each object of the conceptual data model may correspond to one or more rows in a relational database or an entry in Lightweight Directory Access Protocol (LDAP) database, or any combination of one or more databases.

Figure 8A:
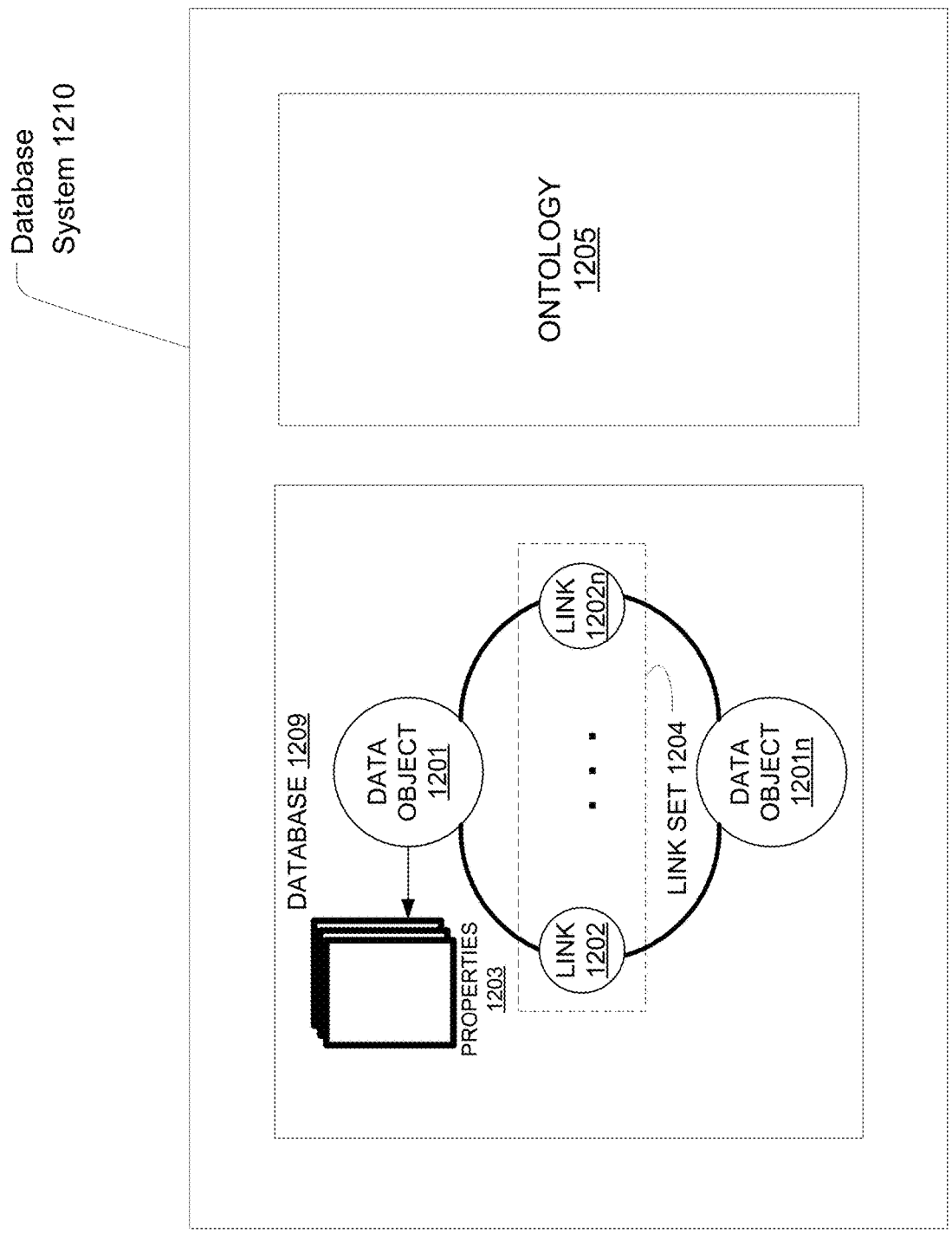
FIG. 8A illustrates one embodiment of a database system using an ontology.

FIG. 8A illustrates an object-centric conceptual data model according to an embodiment. An ontology 1205, as noted above, may include stored information providing a data model for storage of data in the database 1209. The ontology 1205 may be defined by one or more object types, which may each be associated with one or more property types. At the highest level of abstraction, data object 1201 is a container for information representing things in the world. For example, data object 1201 can represent an entity such as a person, a place, an organization, a market instrument, or other noun. Data object 1201 can represent an event that happens at a point in time or for a duration. Data object 1201 can represent a document or other unstructured data source such as an e-mail message, a news report, or a written paper or article. Each data object 1201 is associated with a unique identifier that uniquely identifies the data object within the database system.

Different types of data objects may have different property types. For example, a "Person" data object might have an "Eye Color" property type and an "Event" data object might have a "Date" property type. Each property 1203 as represented by data in the database system 1210 may have a property type defined by the ontology 1205 used by the database 1205.

Objects may be instantiated in the database 1209 in accordance with the corresponding object definition for the particular object in the ontology 1205. For example, a specific monetary payment (e.g., an object of type "event") of US$30.00 (e.g., a property of type "currency") taking place on 3/27/2009 (e.g., a property of type "date") may be stored in the database 1209 as an event object with associated currency and date properties as defined within the ontology 1205.

The data objects defined in the ontology 1205 may support property multiplicity. In particular, a data object 1201 may be allowed to have more than one property 1203 of the same property type. For example, a "Person" data object might have multiple "Address" properties or multiple "Name" properties.

Each link 1202 represents a connection between two data objects 1201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 1201 can have multiple links with another data object 1201 to form a link set 1204. For example, two "Person" data objects representing a husband and a wife could be linked through a "Spouse Of" relationship, a matching "Address" property, and one or more matching "Event" properties (e.g., a wedding). Each link 1202 as represented by data in a database may have a link type defined by the database ontology used by the database.

Figure 8B:
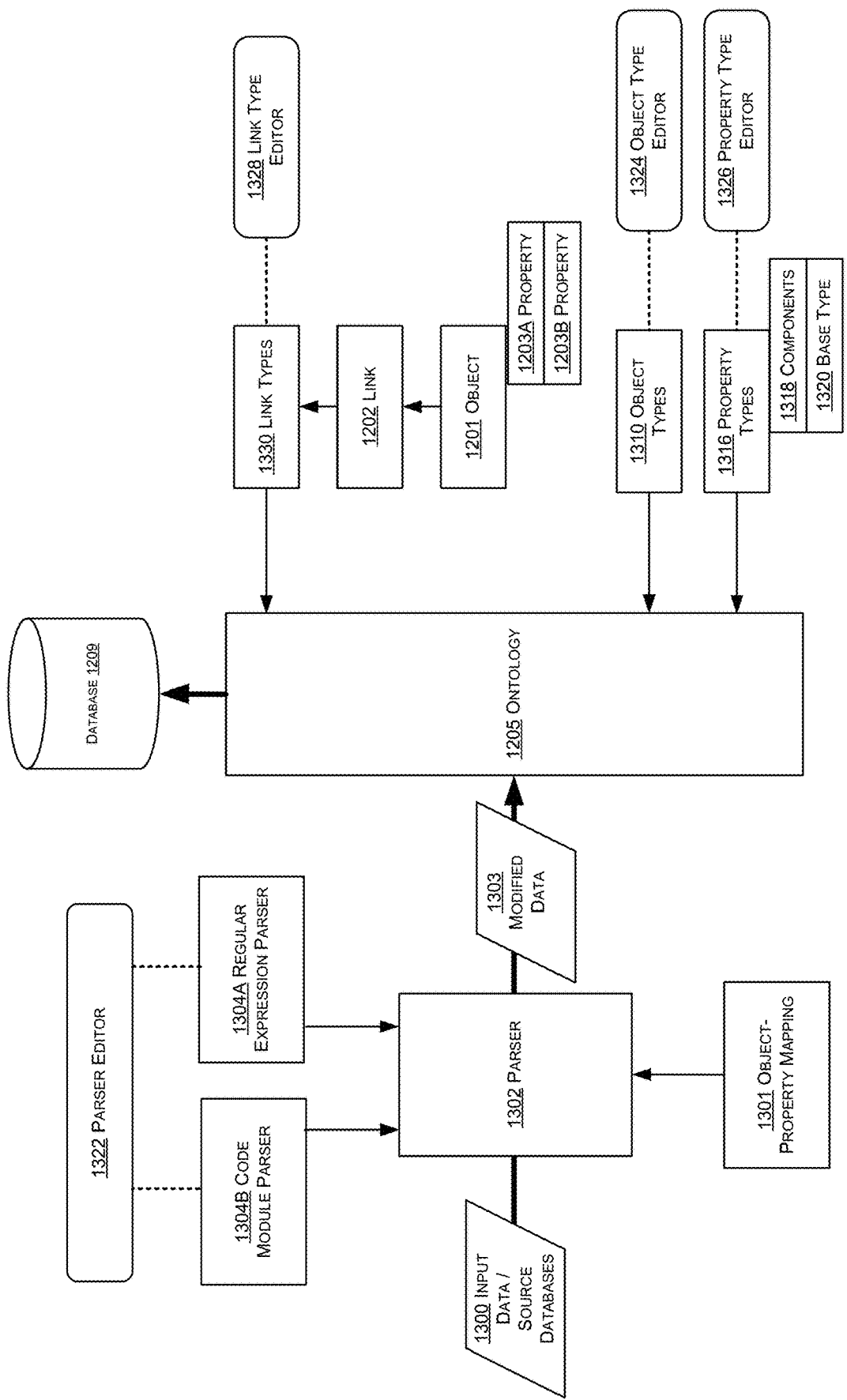
FIG. 8B illustrates one embodiment of a system for creating data in a data store using a dynamic ontology.

FIG. 8B is a block diagram illustrating exemplary components and data that may be used in identifying and storing data according to an ontology. In this example, the ontology may be configured, and data in the data model populated, by a system of parsers and ontology configuration tools. In the embodiment of FIG. 8B, input data 1300 is provided to parser 1302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1302 is able to read a variety of source input data types and determine which type of data it is reading.

In accordance with the discussion above, the example ontology 1205 comprises stored information providing the data model of data stored in database 1209, and the ontology is defined by one or more object types 1310, one or more property types 1316, and one or more link types 1330. Based on information determined by the parser 1302 or other mapping of source input information to object type, one or more data objects 1201 may be instantiated in the database 209 based on respective determined object types 1310, and each of the objects 1201 has one or more properties 1203 that are instantiated based on property types 1316. Two data objects 1201 may be connected by one or more links 1202 that may be instantiated based on link types 1330. The property types 1316 each may comprise one or more data types 1318, such as a string, number, etc. Property types 1316 may be instantiated based on a base property type 1320. For example, a base property type 1320 may be "Locations" and a property type 1316 may be "Home."

In an embodiment, a user of the system uses an object type editor 1324 to create and/or modify the object types 1310 and define attributes of the object types. In an embodiment, a user of the system uses a property type editor 1326 to create and/or modify the property types 1316 and define attributes of the property types. In an embodiment, a user of the system uses link type editor 1328 to create the link types 1330. Alternatively, other programs, processes, or programmatic controls may be used to create link types and property types and define attributes, and using editors is not required.

In an embodiment, creating a property type 1316 using the property type editor 1326 involves defining at least one parser definition using a parser editor 1322. A parser definition comprises metadata that informs parser 1302 how to parse input data 1300 to determine whether values in the input data can be assigned to the property type 1316 that is associated with the parser definition. In an embodiment, each parser definition may comprise a regular expression parser 1304A or a code module parser 1304B. In other embodiments, other kinds of parser definitions may be provided using scripts or other programmatic elements. Once defined, both a regular expression parser 1304A and a code module parser 1304B can provide input to parser 1302 to control parsing of input data 1300.

Using the data types defined in the ontology, input data 1300 may be parsed by the parser 1302 determine which object type 1310 should receive data from a record created from the input data, and which property types 1316 should be assigned to data from individual field values in the input data. Based on the object-property mapping 1301, the parser 1302 selects one of the parser definitions that is associated with a property type in the input data. The parser parses an input data field using the selected parser definition, resulting in creating new or modified data 1303. The new or modified data 1303 is added to the database 1209 according to ontology 205 by storing values of the new or modified data in a property of the specified property type. As a result, input data 1300 having varying format or syntax can be created in database 1209. The ontology 1205 may be modified at any time using object type editor 1324, property type editor 1326, and link type editor 1328, or under program control without human use of an editor. Parser editor 1322 enables creating multiple parser definitions that can successfully parse input data 1300 having varying format or syntax and determine which property types should be used to transform input data 300 into new or modified input data 1303.

The properties, objects, and links (e.g. relationships) between the objects can be visualized using a graphical user interface (GUI). For example, FIG. 8C displays a user interface showing a graph representation 1403 of relationships (including relationships and/or links 1404, 1405, 1406, 1407, 1408, 1409, 1410, 1411, 1412, and 1413) between the data objects (including data objects 1421, 1422, 1423, 1424, 1425, 1426, 1427, 1428, and 1429) that are represented as nodes in the example of FIG. 8C. In this embodiment, the data objects include person objects 1421, 1422, 1423, 1424, 1425, and 1426; a flight object 1427; a financial account 1428; and a computer object 1429. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 8C:
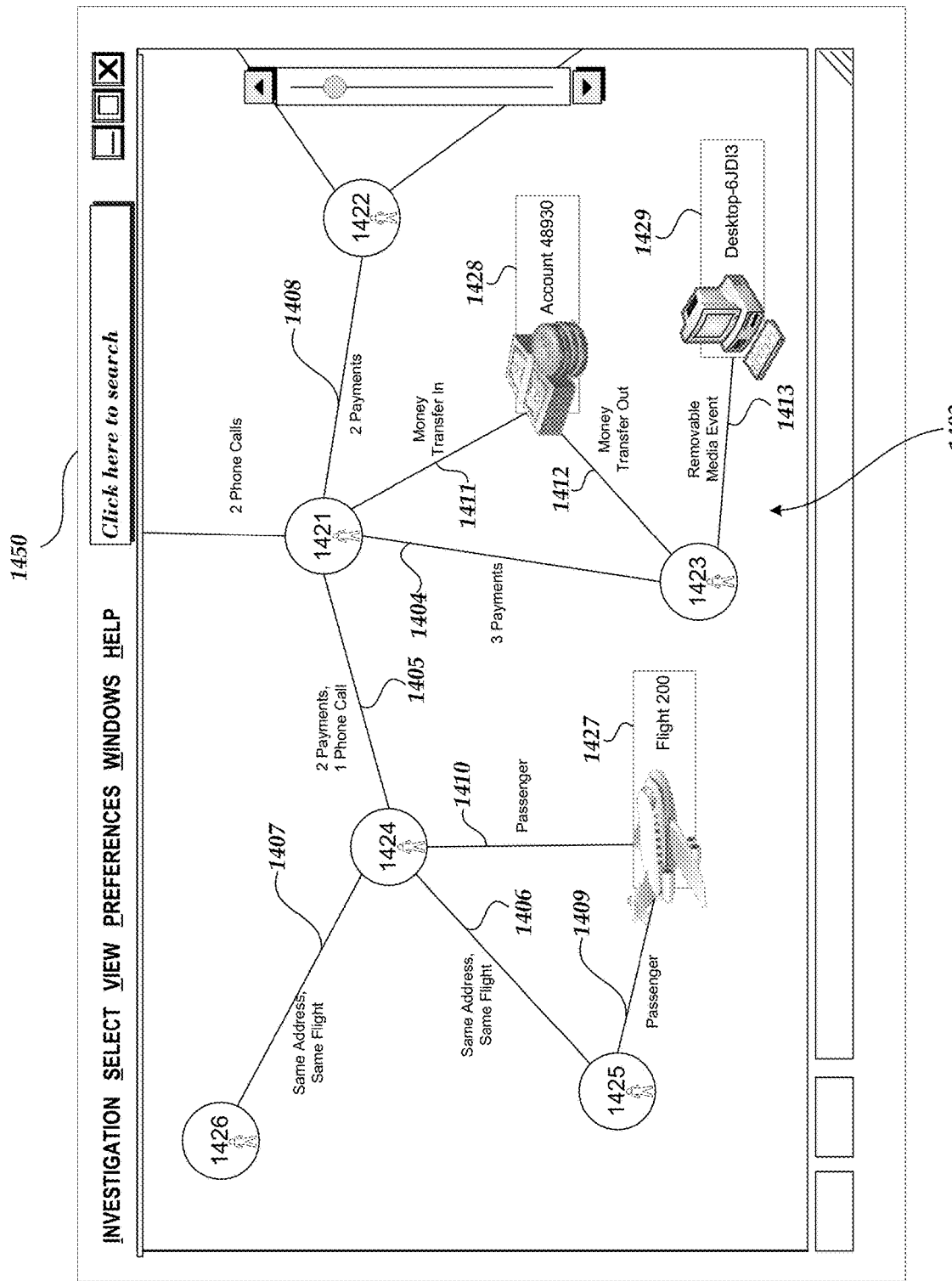
FIG. 8C illustrates a sample user interface using relationships described in a data store using a dynamic ontology.

For example, in FIG. 8C, relationship 1404 is based on a payment associated with the individuals indicated in person data objects 1421 and 1423. The link 1404 represents these shared payments (for example, the individual associated with data object 1421 may have paid the individual associated with data object 1423 on three occasions). The relationship is further indicated by the common relationship between person data objects 1421 and 1423 and financial account data object 1428. For example, link 1411 indicates that person data object 1421 transferred money into financial account data object 1428, while person data object 1423 transferred money out of financial account data object 1428. In another example, the relationships between person data objects 1424 and 1425 and flight data object 1427 are indicated by links 1406, 1409, and 1410. In this example, person data objects 1424 and 1425 have a common address and were passengers on the same flight data object 1427. In an embodiment, further details related to the relationships between the various objects may be displayed. For example, links 1411 and 1412 may, in some embodiments, indicate the timing of the respective money transfers. In another example, the time of the flight associated with the flight data object 1427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In various embodiments, data objects may further include geographical metadata and/or links. Such geographical metadata may be accessed by the interactive data object map system for displaying objects and features on the map interface (as described above).

In addition to visually showing relationships between the data objects, the user interface may allow various other manipulations. For example, the objects within database 1108 may be searched using a search interface 1450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. Additionally, as described above, objects within database 1108 may be searched, accessed, and implemented in the map interface of the interactive data object map system via, for example, a geosearch and/or radius search.

Implementation Mechanisms

According to an embodiment, the interactive data object map system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8D:
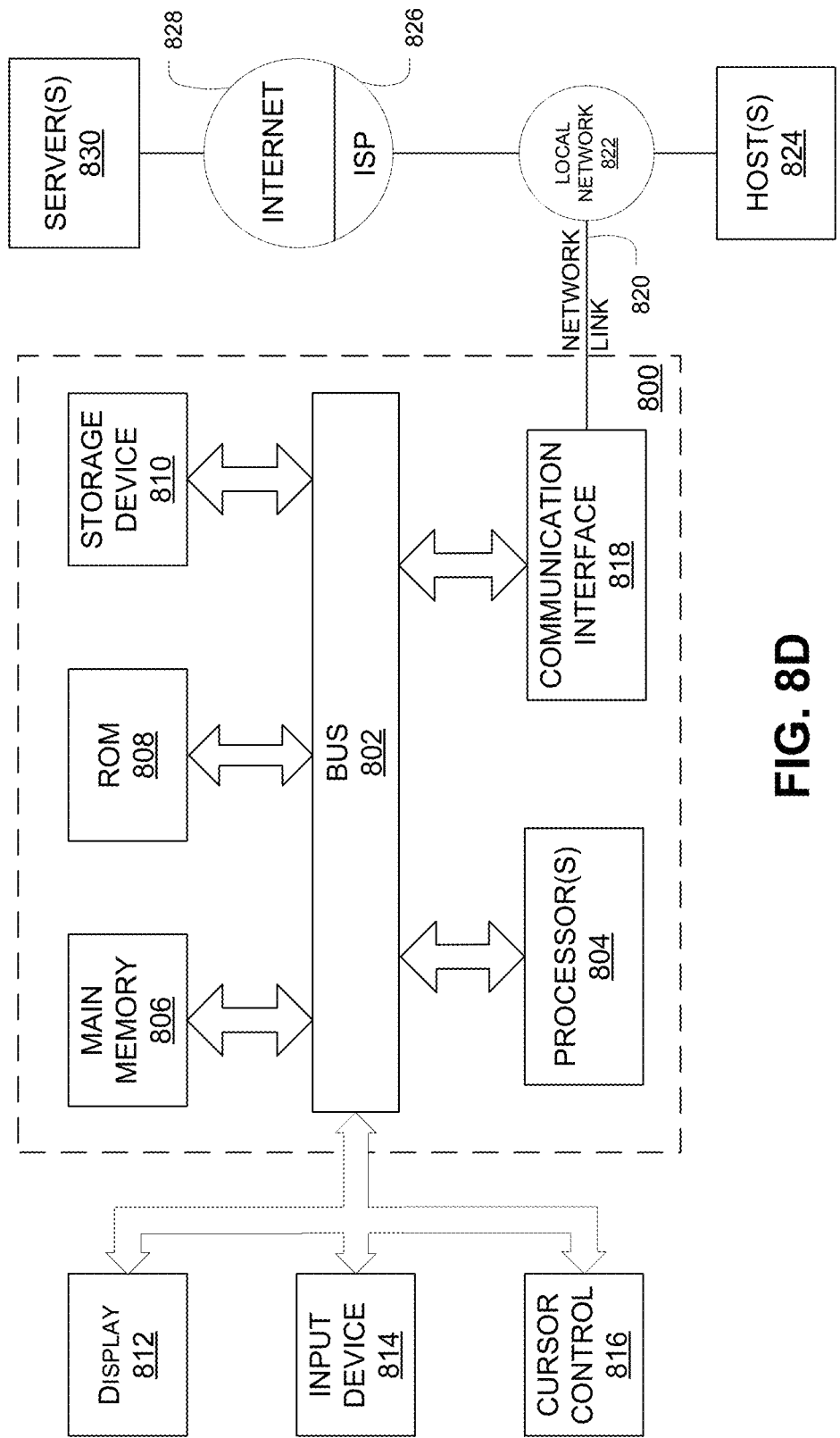
FIG. 8D illustrates a computer system with which certain methods discussed herein may be implemented.

For example, FIG. 8D is a block diagram that illustrates a computer system 800 upon which the various systems and methods discussed herein may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT), LCD display, or touch screen display, for displaying information to a computer user and/or receiving input from the user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module, and/or various other types of modules to implement a GUI, a map interface, and the various other aspects of the interactive data object map system. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. Server-side components of the interactive data object map system described above (for example, with reference to FIGS. 7A and 7B) may be implemented in the server 830. For example, the server 830 may compose map layers and tiles, and transmit those map tiles to the computer system 800.

The computer system 800, on the other hand, may implement the the client-side components of the map system as described above (for example, with reference to FIGS. 6A and 6B). For example, the computer system may receive map tiles and/or other code that may be executed by processor 804 as it is received, and/or stored in storage device 810, or other non-volatile storage for later execution. The computer system 800 may further compose the map interface from the map tiles, display the map interface to the user, generate object outlines and other functionality, and/or receive input from the user.

In an embodiment, the map system may be accessible by the user through a web-based viewer, such as a web browser. In this embodiment, the map interface may be generated by the server 830 and/or the computer system 800 and transmitted to the web browser of the user. The user may then interact with the map interface through the web-browser. In an embodiment, the computer system 800 may comprise a mobile electronic device, such as a cell phone, smartphone, and/or tablet. The map system may be accessible by the user through such a mobile electronic device, among other types of electronic devices.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
a computer readable medium storing software modules including computer executable instructions; and
one or more hardware processors in communication with the computer readable medium, and configured to execute a user interface module of the software modules in order to:
display a plurality of features each associated with metadata;
detect a feature associated with a plurality of characters and the associated metadata in response to a user feature hover input of a particular feature included on an interactive map; and
in response to detecting the feature hover input:
determine a section of contiguous characters associated with the particular feature based on common metadata associated with each of the contiguous characters;
determine boundaries associated with the particular feature based on the determined section of contiguous characters; and
render an outline of the particular feature on the interactive map based on the determined boundaries.

2. The computer system of claim 1, wherein the one or more hardware processors are further configured to execute the computer-executable instructions in order to:
in response to the user hovering over the particular feature, retrieve the metadata associated with the particular features and display the metadata to the user.

3. The computer system of claim 2, wherein retrieving the metadata associated with the particular feature is based at least in part on a feature identifier associated with the feature.

4. The computer system of claim 1, wherein the one or more hardware processors are further configured to execute the computer-executable instructions in order to:
in response to a first input from the user selecting a plurality of the included features:
determine metadata associated with respective selected features; and
determine one or more metadata categories associated with at least one of the determined metadata.

5. The computer system of claim 4, wherein the one or more hardware processors are further configured to execute the computer-executable instructions in order, for each of the determined metadata categories, to:
generate one or more histograms including metadata categories associated with respective selected features, each of the histograms including a visual indicator indicating a quantity of the respective selected plurality of features included on the interactive map associated with the respective metadata category; and
display the one or more histograms on the display along with the interactive map.

6. The computer system of claim 5, wherein each of the histograms includes a visual indicator indicating a quantity of the respective features of the plurality of features included on the interactive map having the respective metadata value within the metadata category.

7. The computer system of claim 6, wherein each histogram of the one or more histograms is specific to a particular metadata category.

8. The computer system of claim 7, wherein each histogram of the one or more histograms comprises a list of items of metadata specific to the particular metadata category of the histogram, wherein the list of items is organized in descending order from an item having the largest number of related features to an item having the smallest number of related features.

9. The computer system of claim 6, wherein the one or more hardware processors are configured to execute the computer-executable instructions in order to:
receive a user selection of a plurality of features associated with the one or more histograms; and
in response to the user selection:
update the interactive map to display the plurality of selected features on the display; and
highlight the plurality of selected features on the interactive map.

10. The computer system of claim 1, wherein the one or more hardware processors are configured to execute the computer-executable instructions in order to:
associate the plurality of features with respective feature identifiers; and
for each pixel of the interactive map, associate a character with the pixel based on the associated feature.

11. A computer-implemented method comprising:
displaying a plurality of features each associated with metadata;
detecting a feature associated with a plurality of characters and the associated metadata in response to a user feature hover input of a particular feature included on an interactive map; and
in response to detecting the feature hover input:
determining a section of contiguous characters associated with the particular feature based on common metadata associated with each of the contiguous characters;
determining boundaries associated with the particular feature based on the determined section; and
rendering an outline of the particular feature on the interactive map based on the determined boundaries.

12. The method of claim 11 further comprising:
in response to the user hovering over the particular feature, retrieving the metadata associated with the particular feature and displaying the metadata to the user.

13. The method of claim 12, wherein retrieving the metadata associated with the particular feature is based at least in part on a feature identifier associated with the feature.

14. The method of claim 13 further comprising:
in response to a first input from the user selecting a plurality of the included features:
determining metadata associated with respective selected features; and
determining one or more metadata categories associated with at least one of the determined metadata.

15. The method of claim 14 further comprising:
for each of the determined metadata categories:
generating one or more histograms including metadata categories associated with respective selected features, each of the histograms including a visual indicator indicating a quantity of the respective selected plurality of features included on the interactive map associated with the respective metadata category; and
displaying the one or more histograms on the display along with the interactive map.

16. The method of claim 15, wherein each histogram of the one or more histograms comprises a list of items of metadata specific to a particular metadata category of the histogram, wherein the list of items is organized in descending order from an item having the largest number of related features to an item having the smallest number of related objects.

17. The method of claim 15, further comprising:
receiving a user selection of a plurality of features associated with the one or more histograms; and
in response to the user selection:
updating the interactive map to display the plurality of selected features on the display; and
highlighting the plurality of selected features on the interactive map.

18. The method of claim 11, further comprising:
associating the plurality of features with respective feature identifiers; and
for each pixel of the interactive map, associate a character with the pixel based on the associated feature.

19. The computer system of claim 1, wherein the plurality of characters comprise a stored representation of the feature.

* * * * *